US012046219B2

(12) United States Patent
McFadden

(10) Patent No.: US 12,046,219 B2
(45) Date of Patent: Jul. 23, 2024

(54) CYMBAL MOUNTING SYSTEMS, DEVICES AND ACCESSORIES

(71) Applicant: William Randall McFadden, Redondo Beach, CA (US)

(72) Inventor: William Randall McFadden, Redondo Beach, CA (US)

( * ) Notice: Subject to any disclaimer, the term of this patent is extended or adjusted under 35 U.S.C. 154(b) by 0 days.

(21) Appl. No.: 18/450,024

(22) Filed: Aug. 15, 2023

(65) Prior Publication Data

US 2023/0386435 A1 Nov. 30, 2023

Related U.S. Application Data

(63) Continuation of application No. 17/812,907, filed on Jul. 15, 2022, now Pat. No. 11,727,902, which is a continuation of application No. PCT/US2021/014019, filed on Jan. 19, 2021.

(60) Provisional application No. 62/962,184, filed on Jan. 16, 2020.

(51) Int. Cl.
*G10D 13/02* (2020.01)
*G10D 13/063* (2020.01)
*G10D 13/10* (2020.01)

(52) U.S. Cl.
CPC ........... *G10D 13/28* (2020.02); *G10D 13/063* (2020.02)

(58) Field of Classification Search
CPC ...................................................... G10D 13/28
See application file for complete search history.

(56) References Cited

U.S. PATENT DOCUMENTS

| | | | | |
|---|---|---|---|---|
| 392,318 A | | 11/1888 | Dutemple | |
| 1,602,823 A | | 10/1926 | Kole | |
| 1,958,841 A | | 5/1934 | Clinton | |
| 2,139,361 A | | 12/1938 | Fredrickson | |
| 2,163,949 A | * | 6/1939 | Kiemle | G10D 13/28 984/154 |
| 3,009,379 A | | 11/1961 | Thomas | |
| 3,141,370 A | | 7/1964 | Russel | |
| 3,215,020 A | | 11/1965 | Kester, Jr. | |
| 3,677,127 A | | 7/1972 | Garven | |
| 4,028,984 A | | 6/1977 | Sanchez | |
| 4,426,906 A | | 1/1984 | Otto | |
| 4,526,083 A | * | 7/1985 | LeMert | G10D 13/28 984/154 |
| 4,794,654 A | | 1/1989 | Diethelm | |

(Continued)

*Primary Examiner* — Robert W Horn

(74) *Attorney, Agent, or Firm* — Kristian E. Ziegler, Esq.; Heslin, Rothenberg, Farley & Mesiti, P.C.

(57) ABSTRACT

Cymbal mounting systems, devices, components, accessories and related methods are provided. The mounting systems mount a cymbal on a mounting post. The systems include a cymbal mount comprising a sleeve portion elongated along a length configured to extend through a mounting aperture of the cymbal, and comprising a top portion, a bottom portion, and an inner cavity extending from the bottom end along at least a portion of the length configured to mount on the mounting post of the cymbal stand. An outer surface of the sleeve portion varies in maximum cross-sectional size along the length thereof. The systems also include at least one resilient support ring comprising an inner through hole of a cross-sectional size that is smaller than at least a portion of that of the outer surface of the sleeve portion such that the support ring applies a compressive force thereto when mounted thereon.

25 Claims, 18 Drawing Sheets

(56) References Cited

U.S. PATENT DOCUMENTS

| | | | | |
|---|---|---|---|---|
| 4,960,028 A * | 10/1990 | Ramirez | G10D 13/24 | 984/154 |
| 5,367,939 A * | 11/1994 | Barker | G10D 13/063 | 84/404 |
| 6,162,978 A * | 12/2000 | Chang | G10D 13/063 | 84/421 |
| 6,259,011 B1 * | 7/2001 | Liao | G10D 13/063 | 84/421 |
| 7,199,297 B2 * | 4/2007 | Anderson | G10D 13/24 | 84/422.3 |
| 7,915,507 B2 * | 3/2011 | Onheiser | G10D 13/063 | 84/411 R |
| 8,334,448 B2 * | 12/2012 | Onheiser | G10D 13/063 | 84/421 |
| 9,224,372 B1 * | 12/2015 | Spriggel | G10D 13/28 | |
| 9,659,550 B2 | 5/2017 | Jasperson | | |
| 9,842,574 B2 * | 12/2017 | McFadden | G10D 13/063 | |
| 10,262,636 B2 | 4/2019 | Sutton | | |
| 10,446,125 B2 * | 10/2019 | Juravich | G10D 13/063 | |
| 10,643,589 B1 | 5/2020 | McKee | | |
| 10,854,179 B2 * | 12/2020 | Miyajima | G10D 13/28 | |
| 11,295,716 B2 | 4/2022 | Trombley | | |
| 11,727,902 B2 * | 8/2023 | McFadden | G10D 13/28 | 84/421 |
| 2004/0182222 A1 * | 9/2004 | Demers | G10D 13/28 | 84/422.3 |
| 2011/0072953 A1 * | 3/2011 | Crelin | F16B 37/042 | 84/421 |
| 2012/0017747 A1 * | 1/2012 | Onheiser | G10D 13/063 | 84/421 |
| 2012/0060670 A1 | 3/2012 | Truchsess | | |
| 2016/0372094 A1 | 12/2016 | Jasperson | | |
| 2017/0213530 A1 | 7/2017 | McFadden | | |
| 2018/0254029 A1 * | 9/2018 | Juravich | G10D 13/063 | |
| 2019/0221197 A1 | 7/2019 | Takegawa et al. | | |

* cited by examiner

CYMBAL MOUNTING SYSTEMS, DEVICES AND ACCESSORIES

CROSS-REFERENCE TO RELATED APPLICATION

This application is a continuation of U.S. application Ser. No. 17/812,907, filed on Jul. 15, 2022, and entitled "Cymbal Mounting Systems, Devices and Accessories," which is a by-pass continuation of PCT International Application No. PCT/US2021/014019, filed on Jan. 19, 2021, and entitled "Cymbal Mounting Systems, Devices and Accessories," which claims priority benefit under 35 U.S.C. § 119(e) of U.S. Provisional Patent Application No. 62/962,184, filed on Jan. 16, 2020, and entitled "Cymbal Mount Systems and Accessories," which are incorporated herein by reference in their entireties.

FIELD OF THE DISCLOSURE

The present disclosure generally relates to mounting systems, devices and accessories for percussion instruments cymbals, and more particularly to mounting systems, devices and accessories that mount a cymbal onto a mounting post of a cymbal stand and selectively control the sound of the cymbal when played.

BACKGROUND

Cymbals are a common percussion instrument played by a drummer. Cymbals are used in many ensembles ranging from orchestra, percussion ensembles, jazz bands, heavy metal bands, marching groups and any other musical style or type.

Cymbals typically consist of a thin, normally round, plate or disc of various materials, such as but not limited to metal alloys. Cymbals are configured to make an audible sound (to humans) when struck, such as by a drumstick, via the vibration and/or resonance the cymbal. The majority of cymbals are configured to produce an indefinite pitch, but some other designs are configured to produce a specific definite note or sound.

For mounting purposes, most cymbals include a central circular mounting aperture that extends entirely though the cymbal (i.e., a mounting through hole). Prior to about 1958, typical cymbals were produced with a central circular mounting aperture of about 7/16 inch (about 11 mm). But since 1958, typical cymbals include a central circular mounting aperture of about ½ inch (about 13 mm). The change in the size of the mounting aperture of typical cymbals followed or corresponded to a shift in the size of the mounting posts or portions of typical cymbal stands from about 6 mm (about ¼ inch) in diameter to about 8 mm (about 5/16 inch) in diameter. However, the mounting hole aperture of cymbals may be of any size or shape (but the vast majority of cymbals include an industry standard circular mounting aperture as described above).

In use, cymbals are commonly mounted onto, and supported by, a cymbal stand via their mounting aperture. Some cymbal stands have legs which rest on the ground and a cymbal support shaft which extends upwardly therefrom. In some stands the support shaft extends substantially vertically, and in some other stands the support shaft extends angularly as a boom arm to position the cymbal closer to the drummer than the legs. Cymbal stands also typically include a mounting post or tilter peg that forms a free end of the support shaft onto which a cymbal is mounted and coupled to. Many times the mounting post is vertically oriented, but it may be orientated in any orientation. For example, a movable joint or "tilter" may orient or angle a mounting post with respect to a support shaft.

Mounting posts of typical cymbal stands include a cylindrical portion and a shoulder portion that defines a larger diameter or width than the cylindrical portion. In such embodiments, the cylindrical portion extends from the shoulder portion and defines a free end. The cylindrical portion also typically includes an externally threaded portion and a non-threaded portion extending between the shoulder portion and the externally threaded portion. The cylindrical portion of these mounting posts is sized to extend through the mounting aperture of a cymbal so the cymbal can be mounted or coupled to the thereto and thus supported by the cymbal stand.

More specifically, one conventional method of mounting a cymbal onto a cymbal stand that includes such a mounting post is to initially pass a first rigid washer over the cylindrical portion of the post until it is rests on the shoulder portion thereof (i.e., pass the first rigid washer over the mounting post past the threaded and onto non-threaded portion adjacent the shoulder portion). A relatively thick first felt washer is then passed over the cylindrical portion so that is sits on the first metal washer. The cymbal is then placed on the mounting post such that the mounting post extends through the mounting aperture and the cymbal rests on the first felt washer. A second relatively thick felt washer is then placed over the mounting post and on the cymbal, often followed by a second metal washer that sits of the second felt washer. Lastly, a wing nut or other internally threaded member is screwed down on the threaded portion and into abutment with the second metal washer or second felt washer to lock and/or clamp the cymbal onto the cymbal stand directly between the first and second felt washers and to prevent the cymbal from dismounting from the stand during a use of the cymbal.

While a wing nut is the most typical member for locking down the cymbal or preventing the cymbal from dismounting from the stand during use of the cymbal, there are other mechanisms in use today. These types of mechanisms will be referred to herein as "affixing mechanisms." Affixing mechanisms include, but are not limited to, threaded components, metal press clips, and spring loaded retention features. Typical affixing mechanisms are thus employed and located above the cymbal after it has been placed on the stand over the mounting post, and configured to prevent the cymbal from disengaging from the mounting post by securely gripping or otherwise engaging the post.

Current methods and mechanisms currently used to mount cymbals to cymbal stands, such as to mounting posts thereof, have several disadvantages. For example, current mounting methods and systems are time consuming. Multiple component mounting systems take significant time to properly mount and affix each cymbal onto each stand. It also is time consuming to detach each mounted cymbal and properly store all the mounting components when disassembling each mounted cymbal after use. Because of the small nature of the many loose and separate parts of current mounting systems, parts frequently get misplaced, lost or stolen. Still further, components of current mounting systems are prone to breakage due to restriction or clamping against the cymbal, as well as from drum stick impact, for example. Felt, foam and rubber washers, for example, are configured to fit loosely on cymbal mounts and often fall off when moved, unless locked into position with another mechanism.

Even further, while current mounting systems may provide some protection of the cymbal, they include hard, stiff components made from metals or rigid plastics, for example. These rigid components of current mounting systems are typically located under and over the mounting aperture of the cymbal and, regardless of placement of the felt washers for example, frequently damage the cymbal resulting in failure of the cymbal to produce its intended sound(s) and/or damage to the cymbal. For example, the rigid components of current mounting systems often cause cracks or ruptures in the body of the cymbal adjacent its mounting aperture. These rigid components can also damage a drum stick if the drums stick strikes the components. Still further, the rigid components themselves often chip, crack or otherwise break from repetitive stress and/or drum stick strikes.

Still further, current mounting systems do not allow for the selective adjustment of the range of movement of the cymbal relative to the mounting post. For example, typical current mounting systems include a cylindrical mounting post as described above. Some other current mounting systems include a cylindrical collar or cover that extends over the mounting post. In these mounting systems, as the exterior surface of the mounting portion onto which the cymbal is mounted is cylindrical, the gap or space between the edges of the mounting aperture and the exterior surface of the mounting portion is a constant or fixed size or dimension. Thus, the amount of angular tilting movement (e.g., swing) and vibration of the cymbal, which are at least partially related (or can be affected by) the size of the gap between the edges of the mounting aperture and the exterior surface of the mounting portion, are fixed with current mounting systems and cannot be changed or adjusted.

Yet another disadvantage of current mounting systems and methods is that they negatively impact the sound quality a mounted cymbal. As discussed above, many current mounting systems essentially sandwich a cymbal between rigid materials (e.g., rigid washers and/or a rigid washer and a shoulder portion of a mounting post) regardless of any soft members (e.g., felt or foam washers) used in the mounting systems. Although some systems utilize soft members tightly sandwiched in the local area at the mounting aperture of the cymbal, they do not effectively dissipate the force stresses experienced by the cymbal from repeated impacts on the outside edge of the cymbal, for example. Further, existing mounting systems dampen the natural vibration of a cymbal, impact tonal quality and reduce the overall length of cymbal vibrational sound output after being struck. As noted above, the systems also often lead to cymbal damage which significantly impacts sound quality.

The present disclosure provides improved cymbal mounting systems, devices, components, accessories and related methods that overcome one or more of these disadvantages of the state of the art.

While certain aspects of conventional technologies have been discussed to facilitate disclosure, Applicant in no way disclaims these technical aspects, and it is contemplated that the claimed inventions may encompass one or more conventional technical aspects.

In this specification, where a document, act or item of knowledge is referred to or discussed, this reference or discussion is not an admission that the document, act or item of knowledge or any combination thereof was, at the priority date, publicly available, known to the public, part of common general knowledge, or otherwise constitutes prior art under the applicable statutory provisions; or is known to be relevant to an attempt to solve any problem with which this specification is concerned.

SUMMARY

Briefly, the present disclosure satisfies the need for improved cymbal mounting systems, devices, components, accessories and related methods that may address one or more of the problems and deficiencies of the art discussed above. However, it is contemplated that the present disclosure may prove useful in addressing other problems and deficiencies in a number of technical areas. Therefore, the claimed inventions and present disclosure should not necessarily be construed as limited to addressing any of the particular problems or deficiencies discussed herein.

In a first aspect, the present disclosure provides a cymbal mounting system for mounting at least one cymbal on a mounting post. The system comprises a cymbal mount comprising a sleeve portion elongated along a length direction and comprising a tip at a top portion, a bottom end at a bottom portion, and an inner cavity extending from the bottom end along at least a portion of the length configured to mount on the mounting post of the cymbal stand. The system further comprises at least one resilient support ring comprising a top surface, a bottom surface and an inner through hole extending from the top surface to the bottom surface. The sleeve portion is configured to extend through a mounting aperture of the at least one cymbal when mounted on the mounting post. An outer surface of the sleeve portion varies in maximum cross-sectional size thereof along its length such that the top portion defines a first maximum cross-sectional dimension and the bottom portion defines a second maximum cross-sectional dimension that this greater than the first maximum cross-sectional dimension. The inner through hole comprises a minimum cross-sectional dimension that is less than at least the second maximum cross-sectional dimension such that the at least one elastic support ring applies a compressive force to the outer surface of at least the bottom portion of the sleeve portion when mounted thereon of a degree that is sufficient for the at least one elastic support ring to physically support the at least one cymbal when positioned on the top surface thereof.

In some embodiments, the cymbal mount further comprises a rim portion extending radially outwardly from the bottom portion of the sleeve portion. In some such embodiments, the rim portion is positioned at the bottom end of the sleeve portion. In some other such embodiments, the rim portion is disc shaped. In some other such embodiments, the rim portion extends circumferentially about bottom portion of the sleeve portion. In some such embodiments, the rim portion defines an outer diameter of at least about ½ inch.

In some embodiments, the rim portion and the sleeve portion are integral. In some embodiments, the rim portion and the sleeve portion are formed of a flexible polymer material. In some embodiments, the rim portion and the sleeve portion are integral. In some embodiments, the rim portion defines a top support side facing toward the tip of the sleeve portion configured to physically support the at least one cymbal when positioned thereover. In some such embodiments, the cymbal mount further comprises a liner portion on the top support side of the rim portion, wherein the liner portion is more flexible than at least the rim portion. In some other such embodiments, the at least one resilient support ring comprises at least one first support ring mounted on the sleeve portion positioned between the rim portion and a first cymbal of the at least one cymbal. In some such embodiments, a bottom side of the at least one first ring is positioned on the top support side of the rim portion. In some other such embodiments, a bottom side of the at least one first ring is spaced from the top support side of the rim portion along length direction. In some other such embodiments, the at least one resilient support ring further comprises at least one second support ring mounted on the sleeve portion positioned above the first cymbal along the length direction. In some such embodiments, the at least one cymbal comprises a second cymbal mounted on the sleeve portion and supported by the top surface of the at least one second first ring, and wherein the at least one resilient support ring comprises at least one third ring mounted on the sleeve portion positioned above the second cymbal.

In some embodiments, the cymbal mount is on one-piece construction. In some embodiments, the cymbal mount is formed of a flexible polymer material. In some such embodiments, the cymbal mount is formed of a flexible elastomer. In some such embodiments, the cymbal mount is formed of a thermoplastic elastomer material.

In some embodiments, the cymbal mount is formed of a material having a Shore A hardness within the range of about 80A to about 105A. In some such embodiments, the cymbal mount is formed of a material having a Shore A hardness within the range of about 90A to about 100A. In some such embodiments, the cymbal mount is formed of a material having a Shore A hardness within the range of about 95A.

In some embodiments, the outer surface of the sleeve further comprises a medial portion positioned between the top and bottom portions along the length direction that defines a third maximum cross-sectional dimension, the third maximum cross-sectional dimension being greater than the first maximum cross-sectional dimension and less than the second maximum cross-sectional dimension. In some such embodiments, the minimum cross-sectional dimension of the inner through hole is less than at least the third maximum cross-sectional dimension such that the at least one elastic support ring applies a compressive force to the outer surface of at least the medial and bottom portions of the sleeve portion when mounted thereon of a degree that is sufficient for the at least one elastic support ring to physically support the cymbal when positioned on the top surface thereof. In some embodiments, the minimum cross-sectional dimension of the inner through hole is less than the first maximum cross-sectional dimension such that the at least one elastic support ring applies a compressive force to the outer surface of the top portion of the sleeve portion when mounted thereon sufficient to retain the at least one elastic support ring on the sleeve portion. In some such embodiments, the first maximum cross-sectional dimension is defined at the tip of the top portion.

In some embodiments, the minimum cross-sectional dimension of the inner through hole is greater than the first maximum cross-sectional dimension. In some embodiments, the maximum cross-sectional dimension of the outer surface of the sleeve portion tapers from the bottom portion to the top portion. In some such embodiments, the maximum cross-sectional dimension of the outer surface of the sleeve portion substantiality smoothly tapers from the bottom portion to the top portion such that the outer surface of the sleeve portion is substantially conical.

In some embodiments, the outer surface of the sleeve portion defines a circular cross-section along its length such that the cross-sectional dimensions thereof comprise diameters. In some such embodiments, the first maximum cross-sectional dimension comprises a diameter of about 10 mm, and the second maximum cross-sectional dimension comprises a diameter of about 13 mm. In some other such embodiments, the inner through hole of the at least one resilient support ring defines a circular cross-section such that the minimum cross-sectional dimension comprises a diameter.

In some embodiments, the second maximum cross-sectional dimension is at least about 10% greater than the first maximum cross-sectional dimension. In some such embodiments, the second maximum cross-sectional dimension is at least about 20% greater than the first maximum cross-sectional dimension. In some embodiments, the second maximum cross-sectional dimension is within the range of about 10% to about 35% greater than the first maximum cross-sectional dimension. In some embodiments, the first maximum cross-sectional dimension is defined at the tip of the top portion.

In some embodiments, the outer surface and the inner cavity of the sleeve portion are formed by an annular wall of the sleeve portion. In some embodiments, a cross-sectional thickness of the annular wall varies along the length of the sleeve portion. In some such embodiments, the inner cavity extends through the sleeve portion along the length direction, and wherein the annular wall defines a first cross-sectional thickness at the top portion and a second cross-sectional thickness at the bottom portion that is greater than the first cross-sectional thickness. In some such embodiments, the annular wall defines a third cross-sectional thickness at a medial portion of the sleeve portion between the bottom and top portions thereof along the length direction that that is greater than the first cross-sectional thickness and less than the second cross-sectional thickness.

In some embodiments, the inner cavity extends entirely through the sleeve portion along the length direction. In some embodiments, the inner cavity is substantially cylindrical such that it defines a substantially constant cross-sectional diameter along the length direction. In some embodiments, the inner cavity of the sleeve portion is non-threaded. In some embodiments, at least a portion of the inner cavity of the sleeve portion is threaded.

In some embodiments, the inner cavity of the sleeve portion defines a minimum cross-sectional dimension that is less than a maximum cross-sectional dimension of the mounting post such that the sleeve portion applies a compressive force to the mounting post when installed thereon. In some such embodiments, the inner cavity of the sleeve portion and the mounting post are cylindrical such that the minimum cross-sectional dimension of the inner cavity and the maximum cross-sectional dimension of the mounting post are diameters. In some other such embodiments, the minimum cross-sectional dimension of the inner cavity is at least about 5% less than the maximum cross-sectional dimension of the mounting post. In some other such embodiments, the minimum cross-sectional dimension of the inner cavity is about 10% less than the maximum cross-sectional dimension of the mounting post. In some other such embodiments, the minimum cross-sectional dimension of the inner cavity is about 7 mm.

In some embodiments, the mounting post defines a length extending between a shoulder portion and a free end thereof, and wherein the length of the sleeve portion is at least one half the length of the mounting post. In some such embodiments, the length of the sleeve portion is greater than the length of the mounting post. In some embodiments, the at least one resilient support ring comprises a thickness between the top and bottom surfaces that extends along the length of the sleeve portion when mounted thereon, and wherein the thickness of the at least one resilient support ring is less than or equal to ⅓ the total length of the sleeve portion such that at least three support rings can be fully mounted thereon at the same time. In some embodiments, the sleeve portion defines a length of at least about 2 inches.

In some embodiments, the cymbal defines a mounting aperture of a minimum cross-sectional size, and wherein the second maximum cross-sectional dimension of the outer surface of the sleeve portion is less than minimum cross-sectional size of the mounting aperture of the cymbal. In some such embodiments, the minimum cross-sectional size of the mounting aperture of the cymbal comprises a diameter of about 13 mm, and the second maximum cross-sectional dimension of the outer surface of the sleeve portion comprises a diameter of about 10 mm.

In some embodiments, the at least one at least one resilient support ring comprises a plurality of at resilient support rings configured to mount to differing portions of the outer surface of the sleeve portion along the length direction. In some such embodiments, the plurality of at resilient support rings comprise at least one support ring positioned below the cymbal along the length direction such that the support ring to physically supports the cymbal on the top surface thereof. In some such embodiments, the plurality of at resilient support rings comprise at least one support ring positioned above the cymbal along the length direction such that the support ring physically prevents the cymbal from dismounting from the sleeve portion.\

In some embodiments, the at least one resilient support ring comprises an inner wall portion extending between the top and bottom surfaces and defining the inner through hole, the inner wall portion directly engages the outer surface of the sleeve portion when mounted thereon. In some embodiments, the top side of the at least one resilient support ring comprises a planar surface. In some embodiments, the at least one resilient support ring is disc shaped. In some embodiments, the at least one resilient support ring defines an outer wall extending between the top and bottom sides thereof, and wherein the outer wall of the at least one resilient support ring defines a circular cross-sectional shape.

In some embodiments, the minimum cross-sectional dimension of the inner through hole is at least about 10% less than the second maximum cross-sectional dimension of the outer surface of the sleeve portion. In some such embodiments, the minimum cross-sectional dimension of the inner through hole is at least about 20% less than the second maximum cross-sectional dimension of the outer surface of the sleeve portion. In some such embodiments, the minimum cross-sectional dimension of the inner through hole is at least about 25% less than the second maximum cross-sectional dimension of the outer surface of the sleeve portion.

In some embodiments, the minimum cross-sectional dimension of the inner through hole is at least about 10% less than the first maximum cross-sectional dimension of the outer surface of the sleeve portion. In some embodiments, the minimum cross-sectional dimension of the inner through hole defines a diameter within the range of about 5 mm and about 10 mm. In some embodiments, the at least one resilient support ring is of one-piece construction.

In some embodiments, the least one resilient support ring is formed of a solid elastomeric material. In some such embodiments, the at least one resilient support ring is formed of neoprene, silicone, ethylene propylene diene monomer (EPDM) rubber, nitrile rubber, a thermoset elastomer, a thermoplastic elastomer or a combination thereof. In some embodiments, the cymbal mount is formed of a Shore A durometer material or a Shore D durometer material.

In some embodiments, the at least one resilient support ring is formed of a Shore A durometer material. In some embodiments, the at least one resilient support ring is formed of a material having a Shore A hardness within the range of about 40A to about 80A. In some embodiments, the at least one resilient support ring is formed of a material having a Shore A hardness within the range of about 50A to about 70A. In some embodiments, the at least one resilient support ring is formed of a material having a Shore A hardness within the range of about 55A to about 65A. In some embodiments, the at least one resilient support ring is formed of a material having a Shore A hardness of about 60A. In some embodiments, the cymbal mount is formed of a material with a first durometer, and the at least one resilient support ring is formed of a material with a second durometer that is less than the first durometer.

In some embodiments, the system further comprises a cymbal accessory configured to mount on the sleeve portion when the cymbal mount is mounted on the mounting post and extend onto the cymbal when the cymbal is mounted on the sleeve portion to alter the sound emitted by the cymbal during use thereof. In some such embodiments, the cymbal accessory comprises a connector member that comprises a mounting hole extending therethrough to accept the sleeve portion therethrough to mount the cymbal accessory on the cymbal mount, and a flexible chain coupled to and extending from the connector member and onto the cymbal. In some such embodiments, the mounting hole defines a minimum cross-sectional dimension that is less than at least the second maximum cross-sectional dimension. In some other such embodiments, the connector member is configured to rotatably mount to the sleeve portion when the sleeve portion extends through the mounting hole such that rotation of the connector member about the sleeve portion causes the flexible chain to wrap about the sleeve portion. In some other such embodiments, the a first portion of the flexible chain is removably coupled to the connector member via a coupling portion of the connector member. In some such embodiments, the coupling portion is configured such that the first portion of the flexible chain can be manually decoupled from the connector member, and a second part of the of the flexible chain can be manually coupled to the connector member via the coupling portion to change a total length of the flexible chain extending from the connector member. In some other such embodiments, the flexible chain comprises a plurality of link members and a plurality of connecting members that interconnect the link members to form the flexible chain. In some such embodiments, the coupling portion of the connector member comprises a pair of engaging portions that form an opening that is configured to allow the connecting members from passing therethrough but prevent the link members from passing therethrough. In some other such embodiments, the coupling portion further comprises a slot formed between ends of the pair of engaging portions that is configured to prevent the connecting members and the link members from passing therethrough in a natural position of the pair of engaging portions. In some other such embodiments, the pair of engaging portions of the coupling portion form an inner cavity that is communication with the mounting hole of the connector member. In some embodiments, the flexible chain comprises a ball chain.

In another aspect, the present disclosure provides a device for selectively mounting at least one cymbal on a mounting post or sleeve along a length thereof. The device comprises at least one resilient support ring comprising a top surface, a bottom surface and an inner through hole extending from the top surface to the bottom surface. The inner through hole comprises a minimum cross-sectional dimension that is less than a maximum cross-sectional dimension of an outer surface of the mounting post or sleeve along its length such that the at least one elastic support ring applies a compressive force to the mounting post or sleeve when mounted thereon of a degree that is sufficient for the at least one elastic support ring to physically support the at least one cymbal when positioned on the top surface thereof.

In some embodiments, the at least one at least one resilient support ring comprises a plurality of at resilient support rings. In some such embodiments, the plurality of at resilient support rings are mounted to differing portions of the outer surface of the mounting post or sleeve along the length direction. In some other such embodiments, the plurality of at resilient support rings comprise a first support ring positioned below a first cymbal of the at least one cymbal along the length direction such that the first support ring physically supports the first cymbal on the top surface thereof. In some such embodiments, the plurality of at resilient support rings comprise at least one second support ring positioned above the first cymbal along the length direction such that the at least one second support ring physically prevents the first cymbal from dismounting from the mounting post or sleeve. In some such embodiments, the at least one cymbal comprises a second cymbal mounted on the sleeve portion and supported by the top surface of the at least one second first ring, and wherein the at least one resilient support ring comprises at least one third ring mounted on the sleeve portion positioned above the second cymbal.

In some embodiments, the at least one resilient support ring comprises a thickness between the top and bottom surfaces that extends along the length of the mounting post or sleeve when mounted thereon, and wherein the thickness of the at least one resilient support ring is less than or equal to ⅓ the total length of the mounting post or sleeve such that at least three support rings can be fully mounted thereon at the same time. In some embodiments, the at least one resilient support ring comprises an inner wall portion extending between the top and bottom surfaces and defining the inner through hole, the inner wall portion directly engages of the outer surface of the mounting post or sleeve when mounted thereon. In some embodiments, the top side of the at least one resilient support ring comprises a planar surface. In some embodiments, the at least one resilient support ring is disc shaped. In some embodiments, the at least one resilient support ring defines an outer wall extending between the top and bottom sides thereof, and wherein the outer wall of the at least one resilient support ring defines a circular cross-sectional shape.

In some embodiments, the minimum cross-sectional dimension of the inner through hole is at least about 10% less than the maximum cross-sectional dimension of the outer surface of the mounting post or sleeve. In some embodiments, the minimum cross-sectional dimension of the inner through hole is at least about 20% less than the maximum cross-sectional dimension of the outer surface of the mounting post or sleeve. In some embodiments, the minimum cross-sectional dimension of the inner through hole is at least about 25% less than the maximum cross-sectional dimension of the outer surface of the mounting post or sleeve.

In some embodiments, the minimum cross-sectional dimension of the inner through hole defines a diameter within the range of about 5 mm and about 10 mm. In some embodiments, the at least one resilient support ring is of one-piece construction. In some embodiments, the at least one resilient support ring is formed of a solid elastomeric material. In some embodiments, the at least one resilient support ring is formed of neoprene, silicone, ethylene propylene diene monomer (EPDM) rubber, nitrile rubber, a thermoset elastomer, a thermoplastic elastomer or a combination thereof.

In some embodiments, the at least one resilient support ring is formed of a Shore A durometer material. In some such embodiments, the at least one resilient support ring is formed of a material having a Shore A hardness within the range of about 40A to about 80A. In some such embodiments, the at least one resilient support ring is formed of a material having a Shore A hardness within the range of about 50A to about 70A. In some such embodiments, the at least one resilient support ring is formed of a material having a Shore A hardness within the range of about 55A to about 65A.

In some embodiments, the at least one resilient support ring is formed of a material having a Shore A hardness of about 60A. In some embodiments, the mounting post or sleeve is formed of a material with a first durometer, and the at least one resilient support ring is formed of a material with a second durometer that is less than the first durometer. In some embodiments, the minimum cross-sectional dimension of the inner through hole defines a diameter within the range of about 5 mm and about 10 mm. In some embodiments, the outer surface of the of the mounting post or sleeve is cylindrical such that the maximum cross-sectional dimension comprises a maximum cross-sectional diameter.

In some embodiments, the outer surface of the mounting post or sleeve varies in maximum cross-sectional size thereof along its length such that a top portion thereof defines a first maximum cross-sectional dimension and a bottom portion thereof defines a second maximum cross-sectional dimension that this greater than the first maximum cross-sectional dimension, and wherein minimum cross-sectional dimension of the inner through hole is less than at least the second maximum cross-sectional dimension such that the at least one elastic support ring applies a compressive force to the outer surface of at least the bottom portion of the mounting post or sleeve when mounted thereon of a degree that is sufficient for the at least one elastic support ring to physically support the at least one cymbal when positioned on the top surface thereof. In some such embodiments, the outer surface of the mounting post or sleeve further comprises a medial portion positioned between the top and bottom portions along the length thereof that defines a third maximum cross-sectional dimension, the third maximum cross-sectional dimension being greater than the first maximum cross-sectional dimension and less than the second maximum cross-sectional dimension. In some such embodiments, the minimum cross-sectional dimension of the inner through hole is less than at least the third maximum cross-sectional dimension such that the at least one elastic support ring applies a compressive force to the outer surface of at least the medial and bottom portions of the mounting post or sleeve when mounted thereon of a degree that is sufficient for the at least one elastic support ring to physically support the at least one cymbal when positioned on the top surface thereof. In some other such embodiments, the minimum cross-sectional dimension of the inner through hole is less than the first maximum cross-sectional dimension such that the at least one elastic support ring applies a compressive force to the outer surface of the top portion of the mounting post or sleeve when mounted thereon sufficient to retain the at least one elastic support ring on the mounting post or sleeve. In some other such embodiments, the minimum cross-sectional dimension of the inner through hole is greater than the first maximum cross-sectional dimension. In some other such embodiments, the first maximum cross-sectional dimension comprises a diameter of about 10 mm, and the second maximum cross-sectional dimension comprises a diameter of about 13 mm.

In some embodiments, the inner through hole of the at least one resilient support ring defines a circular cross-section such that the minimum cross-sectional dimension comprises a diameter. In some embodiments, the at least one cymbal defines a mounting aperture of a minimum cross-sectional size, and wherein the maximum cross-sectional dimension of the outer surface of the mounting post or sleeve is less than minimum cross-sectional size of the mounting aperture of the at least one cymbal. In some such embodiments, the minimum cross-sectional size of the mounting aperture of the at least one cymbal comprises a diameter of about 13 mm, and the maximum cross-sectional dimension of the outer surface of the mounting post or sleeve comprises a diameter of about 10 mm.

In another aspect, the present disclosure provides a device for altering the sound emitted by a cymbal that is mounted on a mounting post or sleeve defining a maximum cross-sectional dimension. The device comprises a connector member that comprises at least one coupling portion and a mounting through hole configured to accept the mounting post or sleeve therethrough to mount the device on the mounting post or sleeve. The device further comprises a flexible chain removably coupled to and extended from the coupling portion of the connector member and onto the cymbal when the cymbal and the connector member are mounted on the mounting post or sleeve.

In some embodiments, the mounting through hole defines a minimum cross-sectional dimension that is greater than the maximum cross-sectional dimension of the mounting post or sleeve. In some embodiments, the mounting through hole defines a minimum cross-sectional dimension that is less than the maximum cross-sectional dimension of the mounting post or sleeve. In some embodiments, the mounting through hole is configured to rotatably mount the connector member to the sleeve portion when the sleeve portion extends therethrough such that rotation of the connector member about the sleeve portion causes the flexible chain to wrap about the mounting post or sleeve.

In some embodiments, the flexible chain comprises a plurality of link members and a plurality of connecting members that interconnect the link members to form the flexible chain. In some such embodiments, the at least one coupling portion of the connector member comprises a pair of engaging portions that form an opening that is configured to allow the connecting members from passing therethrough but prevent the link members from passing therethrough. In some such embodiments, the at least one coupling portion further comprises a slot formed between ends of the pair of engaging portions that is configured to prevent the connecting members and the link members from passing therethrough in a natural position of the pair of engaging portions. In some such embodiments, the pair of engaging portions are deformable such that in a deformed state, the slot is configured to allow the connecting members from passing therethrough.

In some embodiments, the at least one coupling portion of the connector member comprises at least a first coupling portion and a second coupling portion that are configured to allow the connecting members from passing therethrough but prevent the link members from passing therethrough. In some such embodiments, the each of the first and second coupling portions further comprise a slot formed between ends of the pair of engaging portions thereof that is configured to prevent the connecting members and the link members from passing therethrough in a natural position of the respective pair of engaging portions. In some such embodiments, the pairs of engaging portions are deformable such that in a deformed state, the respective slot is configured to allow the connecting members from passing therethrough. In some embodiments, the pair of engaging portions of the at least one coupling portion form an inner cavity that is communication with the mounting through hole of the connector member.

In some embodiments, the flexible chain comprises a ball chain. In some embodiments, the connector member is of one-piece construction. In some embodiments, a first portion of the flexible chain is removably coupled to the connector member via the coupling portion. In some such embodiments, the coupling portion is configured such that the first portion of the flexible chain can be manually decoupled from the connector member, and a second part of the of the flexible chain can be manually coupled to the connector member via the coupling portion to change a total length of the flexible chain extending from the connector member.

Certain embodiments of the presently-disclosed cymbal mounting systems, devices, components, accessories and related methods have several features, no single one of which is solely responsible for their desirable attributes. Without limiting the scope of the cymbal mounting systems, devices, components, accessories and related methods as defined by the claims that follow, their more prominent features will now be discussed briefly. After considering this discussion, and particularly after reading the section of this specification entitled "Detailed Description," one will understand how the features of the various embodiments disclosed herein provide a number of advantages over the current state of the art.

It should therefore be appreciated that all combinations of the foregoing concepts and additional concepts discussed in greater detail below (provided such concepts are not mutually inconsistent) are contemplated as being part of the inventive subject matter disclosed herein and may be used to achieve the benefits and advantages described herein.

These and other features and advantages of the present disclosure will become apparent from the following detailed description of the various aspects of the present disclosure taken in conjunction with the appended claims and the accompanying drawings.

BRIEF DESCRIPTION OF THE DRAWINGS

Features, aspects, and advantages of the present disclosure will become better understood when the following detailed description is read with reference to the accompanying drawings. It should be understood that at least some of the drawings are not necessarily to scale, but at least some of the drawings may be drawn to scale. In certain figures, details that are not necessary for an understanding of the disclosure or that render other details difficult to perceive may have been omitted. It should be understood, of course, that the disclosure is not necessarily limited to the particular embodiments illustrated in the figures. Like reference numerals are utilized throughout the figures to represent like aspects illustrated in the drawings, wherein.

DETAILED DESCRIPTION

Figure 1:
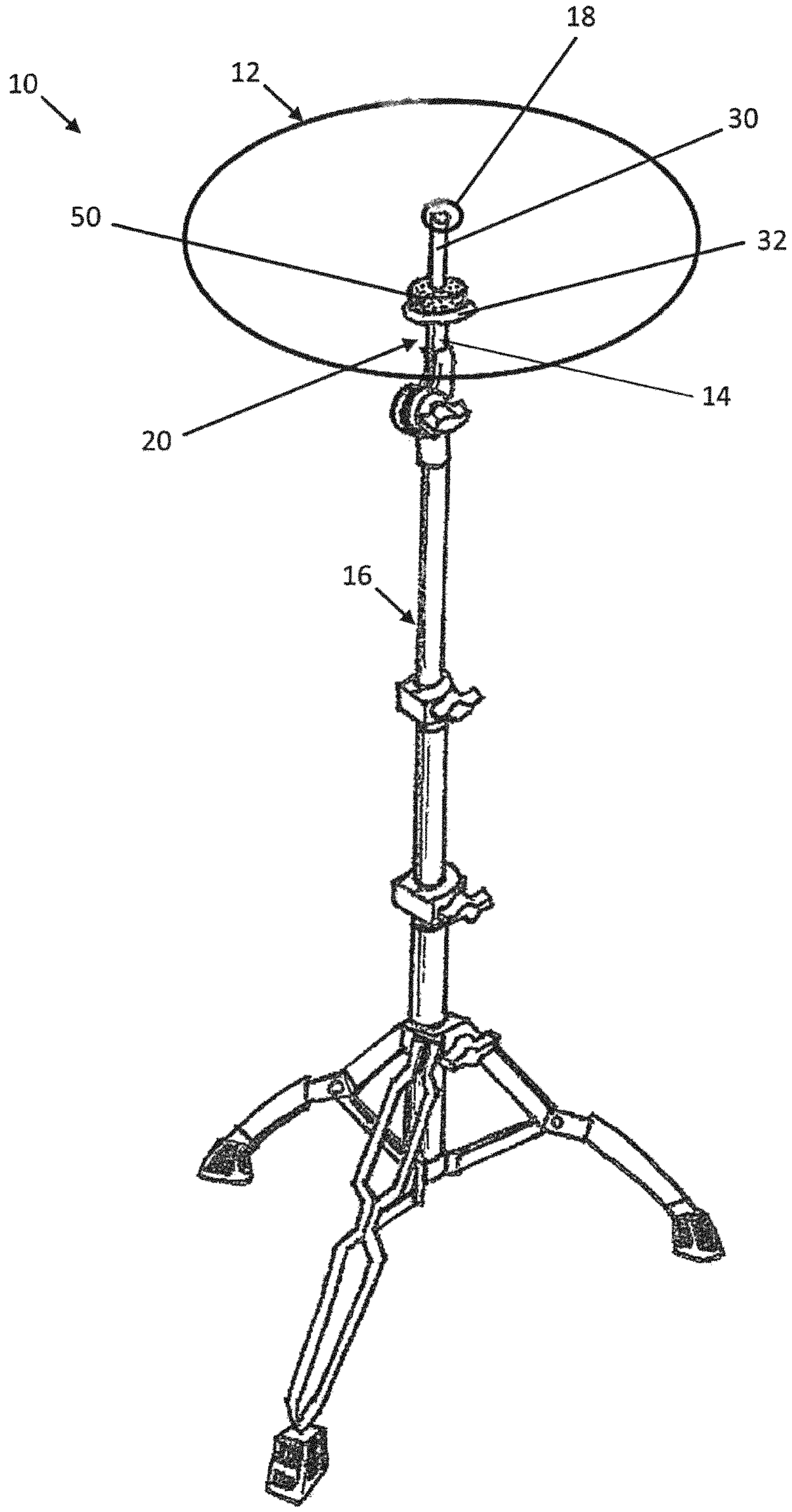
FIG. 1 is an elevational perspective view illustrating an exemplary cymbal being mounted onto an exemplary cymbal stand that includes an exemplary cymbal mounting apparatus according to the present disclosure.

Aspects of the present disclosure and certain features, advantages, and details thereof are explained more fully below with reference to the non-limiting embodiments illustrated in the accompanying drawings. Descriptions of well-known materials, fabrication tools, processing techniques, etc., are omitted so as to not unnecessarily obscure the present disclosure in detail. It should be understood, however, that the detailed description and the specific example(s), while indicating embodiments of the present disclosure, are given by way of illustration only, and are not by way of limitation. Various substitutions, modifications, additions and/or arrangements within the spirit and/or scope of the underlying inventive concepts will be apparent to those skilled in the art from this disclosure.

Approximating language, as used herein throughout disclosure, may be applied to modify any quantitative representation that could permissibly vary without resulting in a change in the basic function to which it is related. Accordingly, a value modified by a term or terms, such as "about" or "substantially," is not limited to the precise value specified. For example, these terms can refer to less than or equal to ±10%, such as less than or equal to ±8%, such as less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%. In some instances, the approximating language may correspond to the precision of an instrument for measuring the value.

Terminology used herein is for the purpose of describing particular examples only and is not intended to be limiting. As used herein, the singular forms "a", "an" and "the" are intended to include the plural forms as well, unless the context clearly indicates otherwise. Furthermore, references to "one example" are not intended to be interpreted as excluding the existence of additional examples that also incorporate the recited features. Moreover, unless explicitly stated to the contrary, the terms "comprising" (and any form of "comprise," such as "comprises" and "comprising"), "have" (and any form of "have," such as "has" and "having"), "include" (and any form of "include," such as "includes" and "including"), and "contain" (and any form of "contain," such as "contains" and "containing") are used as open-ended linking verbs. As a result, any examples that "comprises," "has," "includes" or "contains" one or more step or element possesses such one or more step or element, but is not limited to possessing only such one or more step or element. As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable or suitable. For example, in some circumstances, an event or capacity can be expected, while in other circumstances the event or capacity cannot occur—this distinction is captured by the terms "may" and "may be."

As used herein and unless otherwise indicated, the term "entirety" (and any other form of "entire") means at least a substantial portion, such as at least 95% or at least 99%. The term "entirety" (and any other form of "entire"), as used herein, is thereby not limited to 100%, unless otherwise indicated.

The terms "connect," "connected," "contact," "coupled" and/or the like are broadly defined herein to encompass a variety of divergent arrangements and assembly techniques. These arrangements and techniques include, but are not limited to (1) the direct joining of one component and another component with no intervening components therebetween (i.e., the components are in direct physical contact); and (2) the joining of one component and another component with one or more components therebetween, provided that the one component being "connected to," "contacting" or 'coupled to" the other component is somehow in operative communication (e.g., electrically, fluidly, physically, optically, etc.) with the other component (notwithstanding the presence of one or more additional components therebetween).

The present disclosure provides cymbal mounting apparatuses, systems, devices, accessories and related methods for mounting a cymbal to a mounting post of a cymbal stand, and potentially altering the sound emitted by the cymbal when played (i.e., when struck or otherwise caused to vibrate/resonate). The cymbal apparatuses, systems, devices, accessories make use of a cymbal mount. The cymbal mount may be a single unitary component (i.e., of one-piece construction). In some embodiments, the cymbal apparatuses, systems, devices, accessories make use of a cymbal mount and at least one resilient support ring that assists in mounting at least one cymbal on the cymbal mount.

The cymbal mount of the present disclosure may be a single component molded out of a flexible, yet durable polymeric material. The cymbal mount may define or include an inner or internal cavity with a diameter specifically designed to accept a cymbal support post or member therein. In some embodiments, the inner cavity is configured to compress on or squeeze fit over the support post (i.e., apply a compressive force thereto). A minimum cross-sectional dimension of the inner cavity (such as, but not limited to, a circular cross-sectional shape with the minimum cross-sectional dimension comprising the cross-sectional diameter of the inner cavity) can thereby be configured to be less than a corresponding maximum cross-sectional dimension of the support post (such as, but not limited to, a circular cross-sectional shape with the maximum cross-sectional dimension comprising the cross-sectional diameter of the support post). In this way, when forced over the support post, the cymbal mount is stretched, deformed or deflected such that the support post extends at least partially through the inner cavity, and the cymbal mount applies a compressive force to the support post, to mount the cymbal mount to the support post. The minimum cross-sectional dimension of the inner cavity may thereby be related to the maximum cross-sectional dimension of the support post. In some embodiments, the maximum cross-sectional dimension of the support post may comprise about 6 mm to about 8 mm diameter, and the minimum cross-sectional dimension of the inner cavity may thereby be less than such dimensions. However, the support post may define any other size (or shape), and the inner cavity of the cymbal mount may be configured accordingly such that it exerts a compressive force thereto to mount the cymbal mount on the support post.

In some embodiments, the cymbal mount may also include or define a length specifically designed to extend a minimum distance beyond a free end or top of the mounting post. In some embodiments, the cymbal mount may include or define a length such that the mounting post extends past the free end or tip of the cymbal mount. The squeeze fit feature and the extended length feature may combine to prevent a cymbal from dismounting from the cymbal mount and the cymbal stand during use.

In other embodiments, the cymbal mount may be configured to couple over the mounting post other than (or in addition to) by exerting a compressive force thereto. For example, the inner cavity of the cymbal mount may be configured to threadably couple with the mounting post. In another example, the mounting post may extend into/through an aperture in the cymbal mount, and another member may clamp, screw or otherwise attach the mounting post and the cymbal mount together.

The inner cavity may be defined by an elongated flexible sleeve portion of the cymbal mount. The elongated flexible sleeve may also form an exterior surface such onto which one or more cymbals may be mounted. For example, the exterior surface of the elongated flexible sleeve portion may be configured to extend through a mounting aperture of one or more cymbals such that the one or more cymbals are supported by the cymbal mount. In some embodiments, the cymbal mount may further comprise a cymbal support rim portion extend outwardly from a bottom portion of the sleeve portion, which may support, or assist in supporting, one or more cymbals mounted on the sleeve portion.

In some embodiments, the sleeve portion and the rim portion are integral. In some embodiments, the cymbal mount is elastomeric. In some embodiments, the mounting post and the inner cavity of the sleeve portion are cylindrical, and the cavity extends axially through the elongated length of the sleeve portion. In some embodiments, the sleeve portion defines a circular cross-section, and wherein the rim portion extends circumferentially about and radially outwardly from the sleeve portion. In some embodiments, the rim portion defines an outer diameter of at least about ¾ inches.

In some embodiments, the cavity of the sleeve portion is non-threaded. In some embodiments, at least a portion of the cavity of the sleeve portion is threaded. In some embodiments, the minimum cross-sectional dimension or size (e.g., diameter) of the cavity of the sleeve portion is about 10% undersized as compared to the maximum cross-sectional dimension or size (e.g., diameter) of the mounting post. In some embodiments, the cavity of the sleeve portion defines a minimum cross-sectional diameter of about 7 mm.

In some embodiments, the mounting post defines an axial length extending between a shoulder portion and a free end thereof, and the sleeve portion (and potentially the inner cavity) defines an axial length that is at least one half the length of the mounting post. In some such embodiments, the length of the sleeve portion (and potentially the inner cavity) is greater than the length of the mounting post. In some embodiments, the sleeve portion (and potentially the inner cavity) defines an axial length of at least about 2½ inches.

In some embodiments, one or more cymbals to be mounted to the mounting post via the cymbal mount may define a mounting aperture. The maximum cross-sectional dimension or size (e.g., diameter) of the sleeve portion may equal to or greater than the minimum cross-sectional dimension or size (e.g., diameter) of the mounting aperture of the one or more cymbals. In some other embodiments, the maximum cross-sectional dimension or size (e.g., diameter) of the sleeve portion may equal to or less than the minimum cross-sectional dimension or size (e.g., diameter) of the mounting aperture of the one or more cymbals. In some non-limiting examples, the mounting aperture of the one or more cymbals may define a minimum cross-sectional dimension or size (e.g., diameter) of about 10 mm. However, the mounting aperture may define any other size (or shape), and the sleeve portion of the cymbal mount may be configured accordingly (e.g., include a maximum cross-sectional dimension or size (e.g., diameter) that is less than, equal to or greater than the minimum cross-sectional dimension or size (e.g., diameter) of the mounting aperture).

In some embodiments, a cymbal mounting system or device may include the cymbal mount and at least one protective and/or cushioning washer configured to be positioned on an upper surface of the support rim and extend at least partially about the sleeve portion. In some embodiments, the cymbal mount includes a liner portion extending from an upper portion/surface of the rim portion about at least a portion of the sleeve portion that is configured to cushion and/or protect a cymbal that is mounted on the sleeve portion. The liner portion may thereby be more flexible and/or softer than at least the rim portion of the cymbal mount (and potentially the sleeve portion of the cymbal mount).

In some embodiments, the cymbal mount is of one-piece construction. In some embodiments, the sleeve portion of the cymbal mount extends past the free end of the mounting post when mounted thereon via the inner cavity of the sleeve portion. For example, a tip at an upper or top end portion of the sleeve portion may be positioned past the free end of the mounting post when the cymbal mount is mounted thereon via the inner cavity of the sleeve portion.

In some embodiments, the cymbal mount may be utilized to indirectly mount at least one cymbal on a threaded end of a mounting post (or a non-threaded mounting post) of a cymbal stand that locates, supports and maintains the cymbal on the cymbal stand throughout use. As discussed above, the sleeve portion of the cymbal mount may be configured to be press fit over the free end of the mounting post (e.g., about 6 mm to about 8 mm diameter support post) such that the sleeve portion extends at least over a portion of the mounting post and exerts a compressive force thereon to securely mount/couple the cymbal mount on/to the mounting post. The inner cavity of the cymbal mount may include or define a minimum cross-sectional dimension (e.g., diameter) that is slightly smaller than a maximum cross-sectional dimension (e.g., diameter) of the mounting post to affix the sleeve portion to the mounting post, such as for the life of the cymbal mount. The sleeve portion may extend above or beyond the free end of the mounting post when seated/mounted on the mounting post, such as when partially and/or fully seated on the mounting post. In alternative embodiments, the mounting post may extend past the tip or end of the sleeve portion.

In one exemplary embodiment, the outer surface of the sleeve portion of the cymbal mount may be cylindrical along its length (i.e., define a circular cross-sectional shape of a constant diameter along its length). In some other embodiments, the cross-sectional size and/or shape of the outer surface of the sleeve portion of the cymbal mount may vary along its length. The sleeve portion may thereby define form an outer maximum cross-sectional dimension or size (e.g., diameter) that differ along its axial length. In some such embodiments, the outer surface of the outer surface of the sleeve portion of the cymbal mount may be conical, and/or may taper from a bottom or lower portion to a top or upper portion. The outer surface of the sleeve portion may thereby vary in maximum cross-sectional size thereof along its length such that the top portion defines a first maximum cross-sectional dimension (e.g., diameter) and the bottom portion defines a second maximum cross-sectional dimension (e.g., diameter) that this greater than the first maximum cross-sectional dimension.

In cymbal mount embodiments that include the sleeve portion with variable outer surface maximum cross-sectional dimensions or sizes (e.g., diameters) along its length, the gap formed between a cymbal and the outer surface of the sleeve portion when the cymbal is mounted on the sleeve portion such that the sleeve portion extends through the mounting aperture of the cymbal can be selected or varied by selecting or varying the position of the cymbal along the length of the sleeve portion. The gap between the inner edge of the cymbal forming the mounting aperture and the exterior surface of the sleeve portion may affect the angular movement (e.g., swing) of the cymbal during use thereof, and/or the level or configuration of the dampening of the vibration or resonance of the cymbal during use thereof. As such, the movement and/or sound emitted by the cymbal can thereby be selected or varied by selecting or varying the position of the cymbal along the length of the sleeve portion.

The present disclosure also provides cymbal support rings that effective in mounting one or more cymbals directly to a support post, or to the sleeve portion of the cymbal mount disclosed herein. Traditional felts and other support washers (of various materials including felt and foam and rubber) for use with cymbals and cymbal mounts fit loosely on a cymbal mount. Such items thereby tend to fall off when moved unless locked into position with another mechanism. The cymbal support rings of the present disclosure unique in that they attach to a support port, or the sleeve portion of the cymbal mount disclosed herein, via a compression fit. The cymbal support rings may thereby remain attached to a support port, or the sleeve portion of the cymbal mount, at all times—when the cymbal stand is setup and being utilized, or when stowed or in transport.

The cymbal support rings are resilient/elastic, and comprise a top surface, a bottom surface and an inner through hole extending from the top surface to the bottom surface. The inner through hole comprises a minimum cross-sectional dimension or size (e.g., diameter) that is less than at least the maximum cross-sectional dimension or size (e.g., diameter) of the sleeve portion of the cymbal mount such that the support ring applies a compressive force to the outer surface when mounted thereon of such a degree that the support ring physically supports at least one cymbal positioned on the top surface thereof (and the sleeve portion extending through the mounting aperture of the cymbal). The support rings and the sleeve portion may be configured with respect to each other such that the minimum cross-sectional dimension or size (e.g., diameter) of the inner through hole of the support ring must expand/enlarge by at least 10%, or at least 20%, or within the range of about 20% to about 30%, to be seated on the sleeve portion at its portion defining its maximum cross-sectional dimension or size (e.g., diameter). Stated differently, the maximum cross-sectional dimension or size (e.g., diameter) of the sleeve portion may be greater than the minimum cross-sectional dimension or size (e.g., diameter) of the inner through hole of the support ring by at least 10%, or at least 20%, or within the range of about 20% to about 30%.

It is noted that cymbals sizes and weights vary. For example, a 19 inch diameter cymbal can weigh as little at 1,500 grams, while a ride cymbal can weigh as much as 3,500 grams. To ensure a cymbal is securely mounted on a support post, or the sleeve portion of the cymbal mount, a plurality of the support rings may be utilized. For example, one or more extra support ring can be stacked on top of each other to support the cymbal. Further, more than one support ring can be utilized to mount multiple cymbals on a support post, or the sleeve portion of the cymbal mount. One or more support rings can thereby be utilized on a support post, or the sleeve portion of the cymbal mount, underneath one or more cymbals to provide frictional resistance and support opposite the gravitational force and any force applied to the one or more cymbals during use to securely mount the one or more cymbals on the support post or sleeve portion.

Still further, one or more support rings can be utilized to securely position one or more cymbals on/at a particular location along the length of the sleeve. For example, it may be desirable to space a cymbal from the rim portion of the cymbal mount via one or more support rings, such as to allow for a particular amount of angular movement or swing of the cymbal during use. As another example, when the sleeve portion includes a variable maximum cross-sectional dimension or size (e.g., diameter) along its length, one or more support rings may be utilized to positioned the one or more cymbals along the length of the sleeve portion so that the sleeve portion engages, or is spaced from, the edges of the mounting apertures of the one or more cymbals. As described above, the engagement or relative space between the edges of the mounting aperture of a cymbal and the outer surface of the sleeve affects the angular movement or swing of the cymbal and/or its vibration or resonance when played (i.e., struck), and thereby affects the sound emitted by the cymbal when played. One or more support rings can thereby be utilized to tune, select or vary the movement and or vibration/resonance of one or more cymbals on the variable-sized sleeve portion of the cymbal stand, and thereby tune, select or vary the sound emitted by the one or more cymbals when played.

In some embodiments, a cymbal may be placed directly over the sleeve portion of the cymbal mount via the mount aperture of the cymbal such that the cymbal rests on the on the rim portion. In one embodiment, if desired, at least one support washer or ring, such as an annular elastomer support ring, may be slipped over the sleeve portion and be seated on the rim portion so that the cymbal rests on the washer. In another embodiment, at least one support washer or ring may define an inner aperture or through hole that defines a minimum cross-sectional dimension or size (e.g., diameter) that is less than a maximum cross-sectional dimension or size (e.g., diameter) of the sleeve portion of the cymbal mount such that the at least one support washer or ring applies a compressive force on the sleeve portion that is sufficient to maintain the position of the at least one support washer or ring and at least one cymbal resting on a top side or surface thereof along the length of the sleeve portion (when the cymbal mount is coupled on the mounting post). In some such embodiments, at least one additional support washer or ring may be positioned over/on top of the cymbal to sandwich or clamp the cymbal between the support washers/rings. In some other embodiments, a combination of a plurality of support washers or rings may be utilized beneath a cymbal to position the cymbal at different positions along the length of the sleeve portion. The outer surface of the sleeve portion may define an outer size/width/diameter that varies along its length (e.g., tapers radially inwardly as it extends toward its upper end) such that the space/gap between the inner surface of the mounting aperture in a cymbal and the outer surface of the sleeve portions varies at different positions along the length of the sleeve portion. In this way, the movement and resonance of a cymbal can be adjusted by positioning the cymbal at differing locations along the length of the sleeve portion via changing the position of the support washer/ring immediately below the cymbal (i.e., that directly physically supports the cymbal).

In some embodiments, the cymbal mount may include a liner portion extending from an upper portion of the rim portion about at least a portion of the sleeve portion. The liner portion may be more flexible than at least the rim portion. For example, the liner portion may be a softer material, such as a softer more flexible elastomer material, as compared to the material of the rim portion and/or the sleeve portion. In some embodiments, the liner portion may be an integral soft segment/portion/material over-molded onto the support rim portion (e.g., elastomeric support rim) and/or the sleeve portion (e.g., elastomeric sleeve portion) to eliminate any need for a washer on the mount, if desired. In such an embodiment, the cymbal mount may thereby be a single unitary component solution that always remains attached to a cymbal stand and/or support post (i.e., until it is purposefully removed).

The compressive or squeeze fit feature of the sleeve portion (if provided) of the cymbal mount may allow for the cymbal mount to remain attached to the mounting post of the cymbal stand at all times, thereby eliminating the need to tear down and set up a mounting system for each performance or use and preventing loss of components from handling and storage. The flexible nature of the cymbal mount (e.g., due to its composition, such as elastomeric composition), in one embodiment, may protect a cymbal installed thereon against cracking and breakage, and may thereby extend cymbal life and eliminate unwanted background noises from movement of the cymbal against the hard rigid materials used in conventional mounting systems and mounting posts. The flexible nature (e.g., elastomeric composition) of the cymbal mount may also absorb drum stick strikes, and thereby prevent drum stick damage as well as damage that typically occurs to rigid components in conventional mounting systems.

The extended sleeve length of the sleeve portion of the cymbal mount, in some embodiments, may eliminate the need for an affixing mechanism above the cymbal, eliminate unwanted noise from striking the affixing mechanism above the cymbal, and allow the cymbal to ring freely without vibration dampening. Due to the extended length of the sleeve, such as the sleeve portion being longer than a particular mounting post, a cymbal may be prevented from dismounting from the stand/mount during use or play, and therefore there is no need for any additional parts to secure the cymbal to the mounting post or to protect the cymbal from a mechanical locking mechanism.

Figure 2:
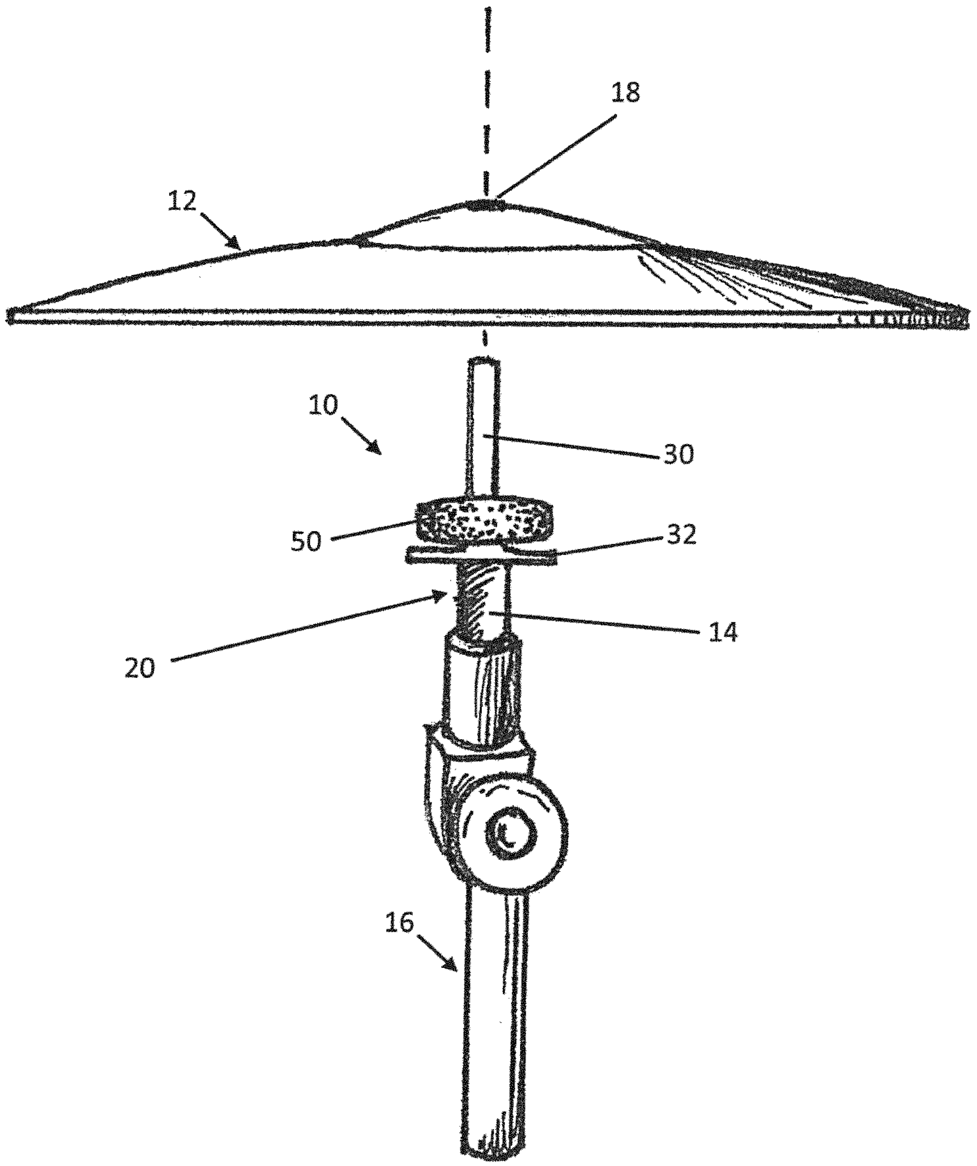
FIG. 2 is an elevational side view illustrating the cymbal being mounted onto the cymbal mounting apparatus of FIG. 1.
Figure 3:
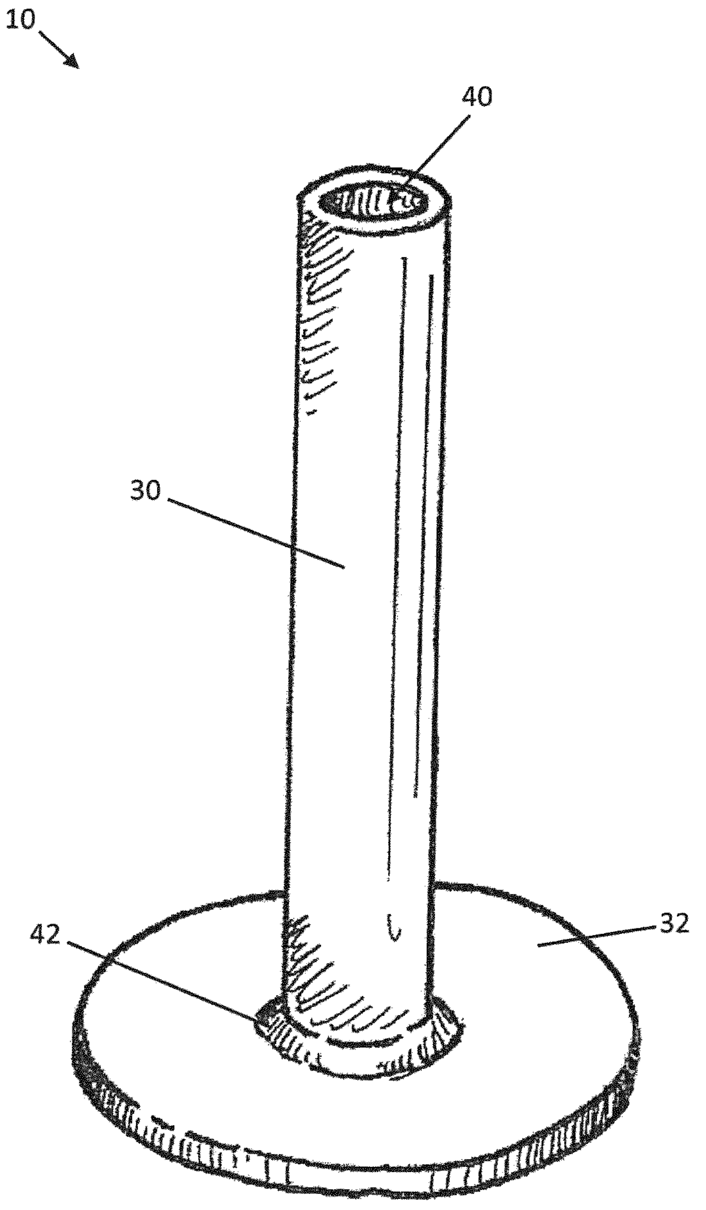
FIG. 3 is an elevational perspective view of an exemplary cymbal mount of the cymbal mounting apparatus of FIG. 1.
Figure 4:
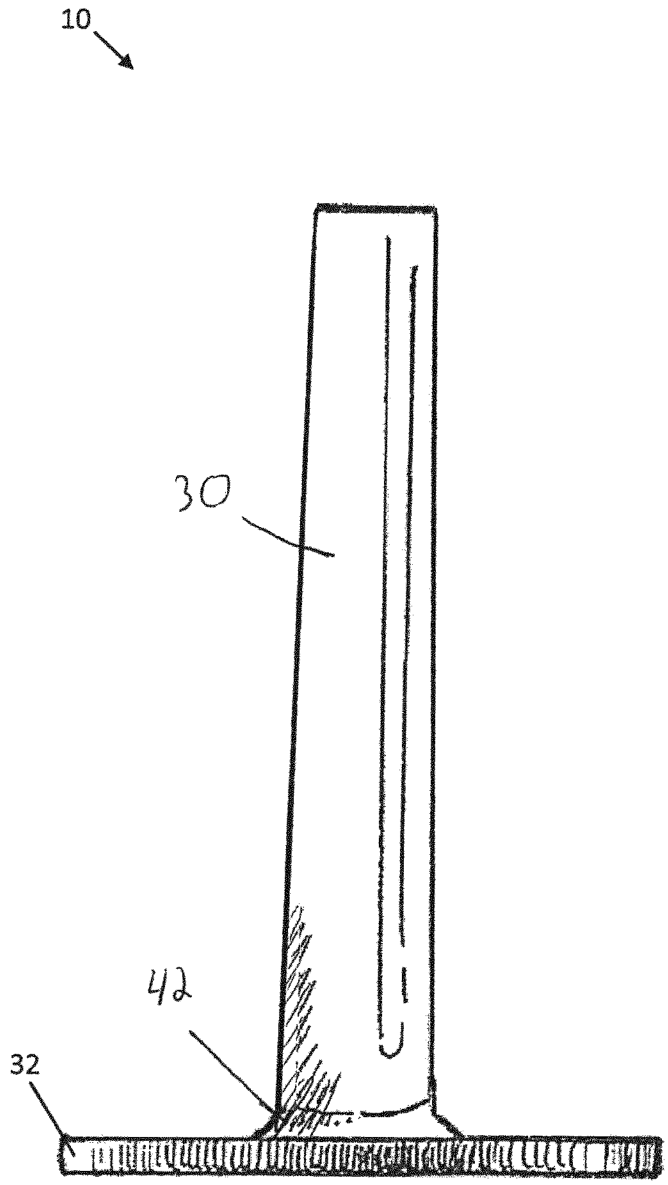
FIG. 4 is a side view of the cymbal mount of FIG. 3.

As shown in FIGS. 1 and 2, in some embodiments the cymbal mounting apparatuses, systems, devices, accessories and related methods of the present disclosure may comprise a cymbal mount 10 for mounting at least one cymbal 12 on/to a mounting post 14. The mounting post may be part of a cymbal stand 16, as shown in FIGS. 1 and 2. However, it will be understood that the cymbal mount 10 could be used to mount any other suitable percussive instrument onto any mounting post 14. Further, the mounting post 14 and/or the cymbal stand 16 may be of any configuration, design or size. For example, the cymbal 12 and the mounting post 14 may be conventional items.

As shown in FIGS. 1, 2 and 10-13, the cymbal 16 may include a mounting aperture 18. In some embodiments, the mounting aperture 18 may be circular, and may be positioned in the center of the cymbal 16. In some embodiments, the mounting aperture 18 may thereby define a circular cross-sectional shape of a particular diameter. However, the mounting aperture 18 may be any size or shape, such as any non-circular regular or irregular shape. Further, the mounting aperture 18 may be positioned anywhere in the cymbal 16. The mounting aperture 18 of a cymbal 16 may thereby include any minimum cross-sectional dimension/size and shape. In some non-limiting example, the cymbal 16 may include a (e.g., circular) mounting aperture 18 with a minimum cross-sectional dimension of about 11 mm (about 7⁄16 inch), or with a minimum cross-sectional dimension of about 13 mm (about ½ inch)

So that a cymbal 16 can mount to the mounting post 14, the mounting post 14 is configured such that it extends through the mounting aperture 18 of the cymbal 16. As shown in FIGS. 1, 2 and 8-13, in some embodiments the mounting post 14 comprises a cylindrical portion, which may be positioned at the top end of the cymbal stand 16, configured to extend through the aperture 18.

As shown in FIGS. 2 and 8-13, the mounting post 14 may include a shoulder portion 20. As shown in FIGS. 8-13, the mounting post 14 may include a cylindrical connecting portion 22 extending from the shoulder portion 20 that defines a free end or top 24. In some other embodiments, the connecting portion 22 may not be cylindrical, but may define a differing shape (e.g., a non-circular cross-sectional shape at least along a portion of the length thereof). In some embodiments, the cylindrical portion 22 may include a threaded portion 26 proximate to the free end 24, and a non-threaded portion 28 proximate to the shoulder portion 20, as also shown in FIGS. 8-13. However, other mounting post 14 may be configured differently, such as not including the shoulder portion 20, not including the non-threaded portion 28, including multiple non-threaded portions 28 and/or threaded portions 26, etc.

Figure 8:
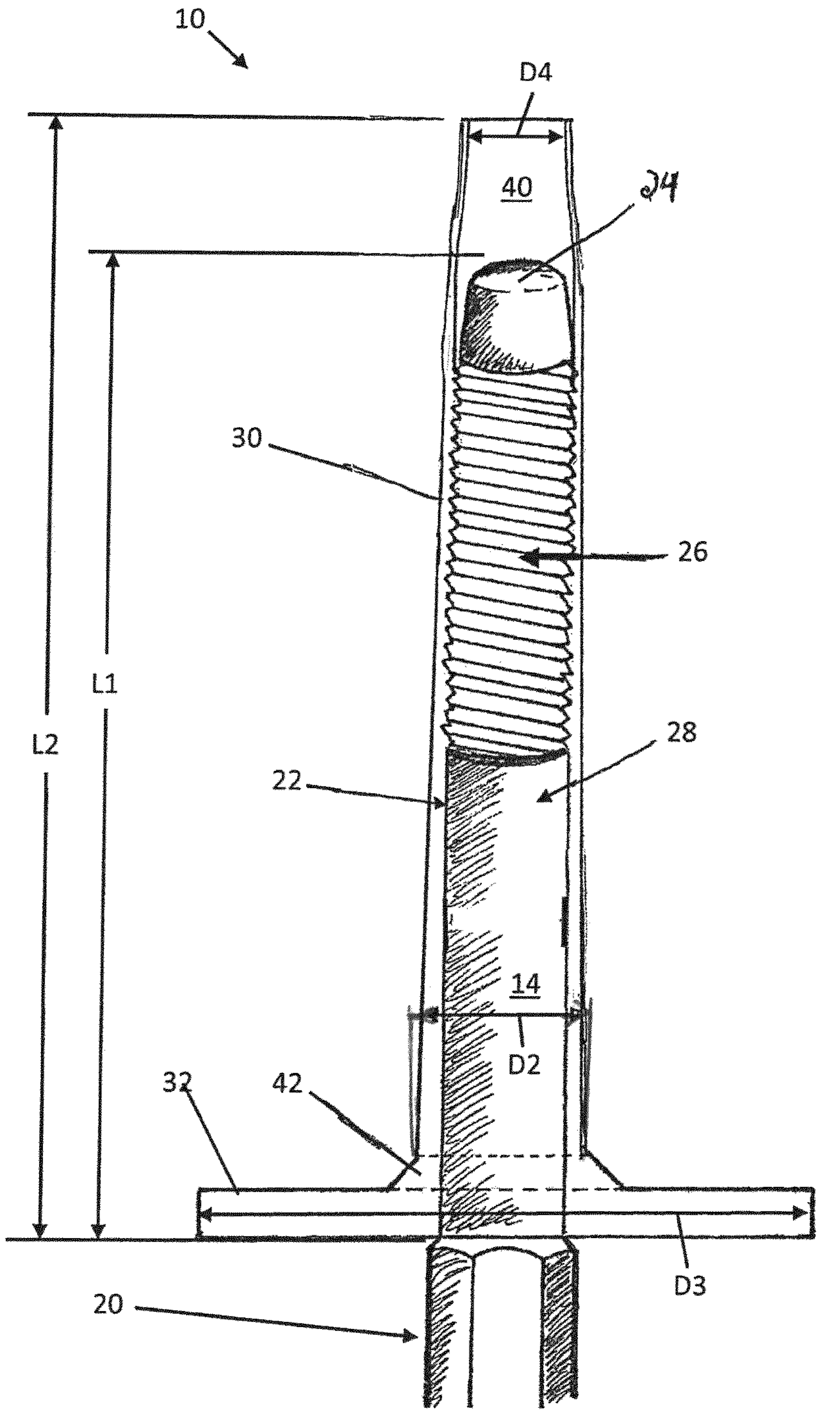
FIG. 8 is a side cross-sectional view of the cymbal mount of FIG. 3 installed on an exemplary mounting post of an exemplary cymbal stand.
Figure 9:
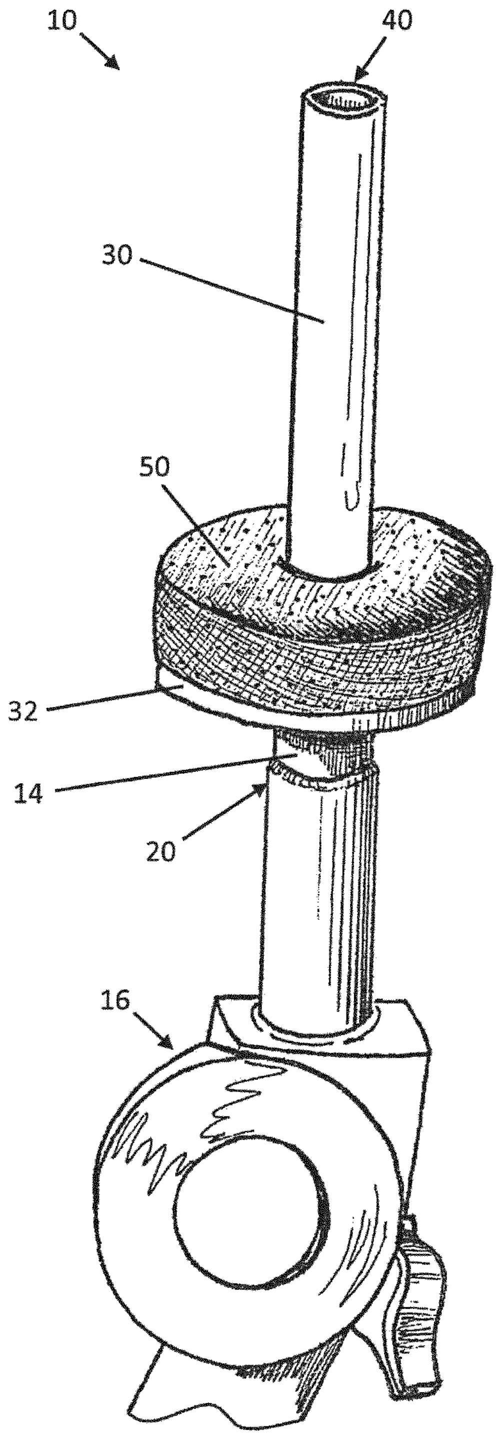
FIG. 9 is an elevational perspective view of the exemplary cymbal mounting apparatus and exemplary mounting post of FIG. 1.

As shown in FIG. 8 the connecting portion 22 of the mounting post 14 may define a maximum cross-sectional dimension or size D1 (such as a diameter D1). The maximum cross-sectional dimension D1 (e.g., diameter) may be any size. In some embodiments, the maximum cross-sectional dimension D1 (e.g., diameter) of the connecting portion 22 of the mounting post 14 may be within the range of about 6-9 mm. In the exemplary illustrative embodiment, the maximum cross-sectional dimension D1 (e.g., diameter) of the connecting portion 22 of the mounting post 14 is about 8 mm. As also shown in FIG. 8, the connecting portion 22 of the mounting post 14 may define an axial length L1 measured from the upper edge or end of the shoulder portion 20 to the free end 24. The axial length L1 may be any length. In the exemplary illustrative embodiment, the length L1 of the connecting portion 22 of the mounting post 14 is at least about 2 inches.

The cymbal mount 10 may be of one-piece construction. In some embodiments, the cymbal mount 10 is formed of a flexible polymer material. In some embodiments, the cymbal mount 10 is formed of a flexible elastomer. In some embodiments, the cymbal mount 10 is formed of a thermoset elastomer or a thermoplastic elastomer material. In some embodiments, the cymbal mount 10 is formed of a material having a Shore A hardness within the range of about 80 A to about 105A, or more preferably a Shore A hardness within the range of about 90A to about 100A. In one exemplary embodiment, the cymbal mount 10 is formed of a material having a Shore A hardness within the range of about 95A.

As shown in FIGS. 1-13, the cymbal mount 10 may include a flexible sleeve portion 30 that is elongated along a length direction and comprises a tip at a top portion, a bottom end at a bottom portion, and an inner cavity 40 extending from the bottom end along at least a portion of the length configured to mount on a cymbal mounting post 14. The sleeve portion 30 is configured to extend through the mounting aperture 18 of the at least one cymbal 14 when the cymbal mount 10 is mounted on the mounting post 14.

The exterior surface of the sleeve portion 30 may define a maximum cross-sectional dimension D2 (e.g., diameter), such as at the bottom portion (e.g., at the bottom end) thereof. The maximum cross-sectional dimension D2 of the exterior surface of the sleeve portion 30 may be any size and any shape. In some embodiments, the maximum cross-sectional dimension D2 of the exterior surface of the sleeve portion 30 may be smaller than the minimum cross-sectional dimension (e.g., diameter) of the mounting aperture 18 of a cymbal 12. For example, in embodiments wherein the minimum cross-sectional dimension of the mounting aperture 18 of a cymbal 12 is about 7⁄16 inch or about 11 mm, the maximum cross-sectional dimension D2 (e.g., diameter) of the exterior surface of the sleeve portion 30 may be about 10 mm, or about 11 mm. The maximum cross-sectional dimension D2 of the exterior surface of the sleeve portion 30 being smaller than the diameter of the mounting aperture 18 of a cymbal 12 may allow the cymbal 12 freely swing during use when positioned over/on the portion of the sleeve portion 30 defining the maximum cross-sectional dimension D2.

In some other embodiments, the maximum cross-sectional dimension D2 (e.g., diameter) of the exterior surface of the sleeve portion 30 may be smaller than the minimum cross-sectional dimension (e.g., diameter) of the mounting aperture 18 of a cymbal 12. In such an embodiments, the cymbal 12 may be positioned over the cymbal mount 10 such that the mounting aperture 18 of the cymbal 12 is slid or translated over the sleeve portion 30 until the edges the mounting aperture 18 of engage, and potentially apply a compressive force, to the portion of the sleeve portion 30 defining the maximum cross-sectional dimension D2. In such an arrangement, the sleeve portion 30 would thereby impede (e.g., limit or damped) the angulation (e.g., swing) and/or vibration/resonance of the cymbal 12 when played/struck, and thereby affect or alter the sound of the cymbal 12 when played/struck.

In some embodiments, the sleeve portion 30 of the cymbal mount 10 may be at least generally cylindrical. For example, the outer surface of the sleeve portion 30 may define a circular cross-section of a constant diameter along its length (not shown). However, in some other embodiments the sleeve portion 30 may define a non-circular cross-section along at least a portion of its length, and/or the maximum size/dimension of the outer surface of the sleeve portion 30 may vary along at least a portion of its length. In some embodiments, the sleeve portion 30 of the cymbal mount 10 is cylindrical (not shown).

As shown in FIGS. 3-13, in some other embodiments the outer surface of the sleeve portion 30 varies in maximum cross-sectional size (e.g., diameter) thereof along its length. In some embodiments, the maximum cross-sectional size of the outer surface of the sleeve portion 30 tapers (i.e., narrows) from its bottom end or end portion, such as adjacent to a rim portion 32, to the tip or top portion thereof, as shown in FIGS. 3-13. In some other embodiments (not shown), the maximum cross-sectional size of the outer surface of the sleeve portion 30 tapers (i.e., narrows) from its tip or top portion to the bottom end or end portion, such as adjacent to the rim portion 32.

In some embodiments, the cross-sectional size or width of the top portion of the sleeve portion 30 may be smaller than that of the bottom portion of the sleeve portion 30, as also shown in FIGS. 3-13. For example, the outer surface of a top portion of the sleeve portion 30 may define a first maximum cross-sectional dimension, and a bottom portion thereof may define a second maximum cross-sectional dimension that this greater than the first maximum cross-sectional dimension, as shown in FIGS. 3-13. The second maximum cross-sectional dimension may be the maximum cross-sectional dimension of the entirety of the sleeve portion 30. In some such embodiments, a medial portion of the sleeve portion 30 positioned between the top and bottom portions along the length direction, may include an outer surface portion that defines a third maximum cross-sectional dimension, the third maximum cross-sectional dimension being greater than the first maximum cross-sectional dimension and less than the second maximum cross-sectional dimension, as shown in FIGS. 3-13.

In some embodiments, the second maximum cross-sectional dimension is at least about 10% greater than the first maximum cross-sectional dimension. In some embodiments, the second maximum cross-sectional dimension is at least about 20% greater than the first maximum cross-sectional dimension. In some embodiments, the second maximum cross-sectional dimension is within the range of about 10% to about 35% greater than the first maximum cross-sectional dimension. In some embodiments, the first maximum cross-sectional dimension comprises a diameter of about 10 mm, and the second maximum cross-sectional dimension comprises a diameter of about 13 mm.

As discussed above, the outer surface of the sleeve portion 30 may taper along its length from the bottom portion to the top portion thereof. In some such embodiments, the first maximum cross-sectional may be defined at the tip of the top portion, and/or the In second maximum cross-sectional may be defined at the bottom most end of the bottom portion, such as adjacent to the rim portion 32 described further below.

In some embodiments, as shown in FIGS. 3-13, the maximum cross-sectional dimensions of the outer surface of the sleeve portion 30 may substantiality smoothly taper from the bottom portion to the top portion. For example, the outer surface of the sleeve portion 30 may define a circular cross-section along its length, and the outer surface may smoothly or consistency taper, such that the outer surface of the sleeve portion 30 is substantially conical. The cross-sectional dimensions of the sleeve portion 30 may thereby comprise diameters. However, in alternative embodiments (not shown), the maximum cross-sectional dimensions of the outer surface of the sleeve portion 30 may not taper smoothly, but rather abruptly or non-linearly. Further, in some embodiments at least a portion of the sleeve portion 30 along its length may not change or taper such that its maximum cross-sectional dimension remains constant along its length.

Figure 10:
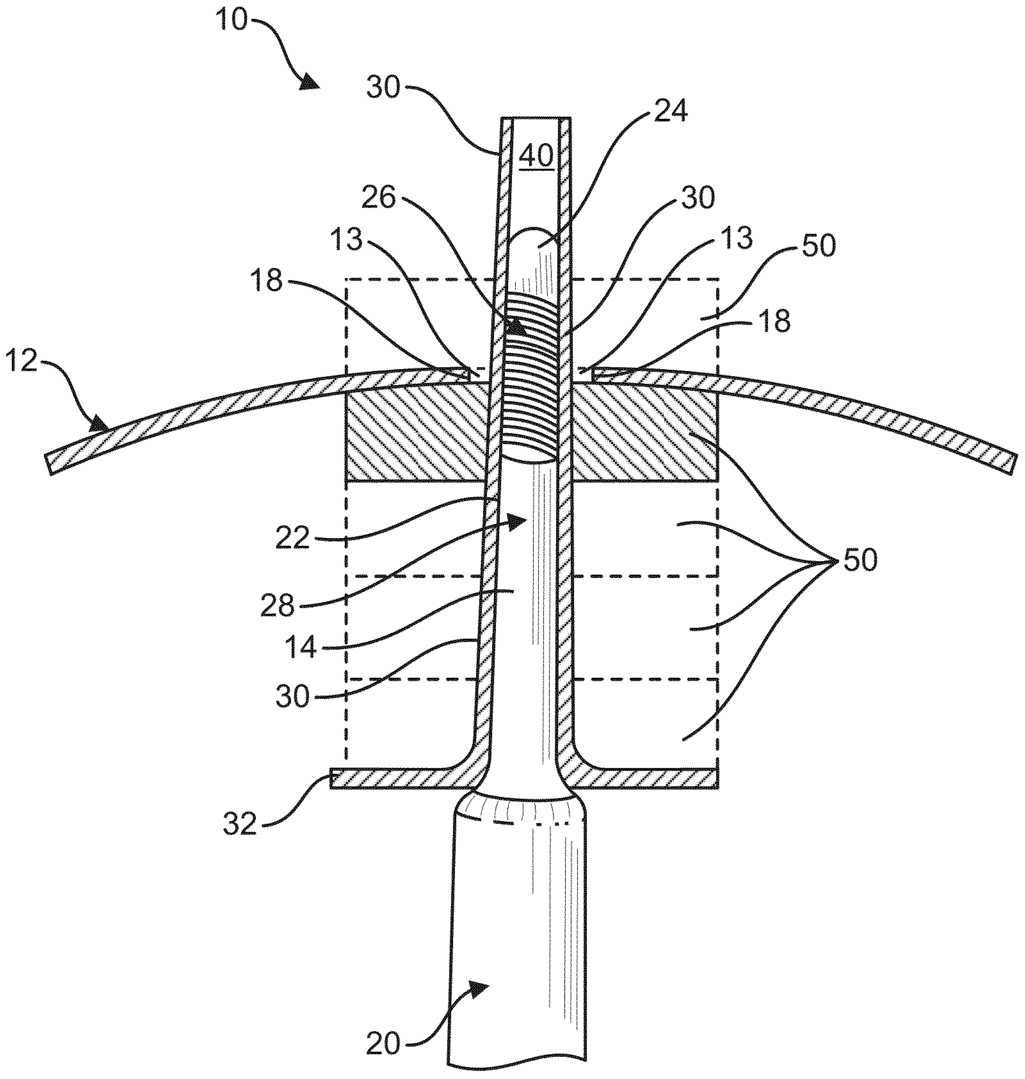
FIG. 10 is a side cross-sectional view of the cymbal mounting apparatus and the mounting post of FIG. 8 mounting an exemplary cymbal at a first position/height along the sleeve portion of the cymbal mounting apparatus.
Figure 11:
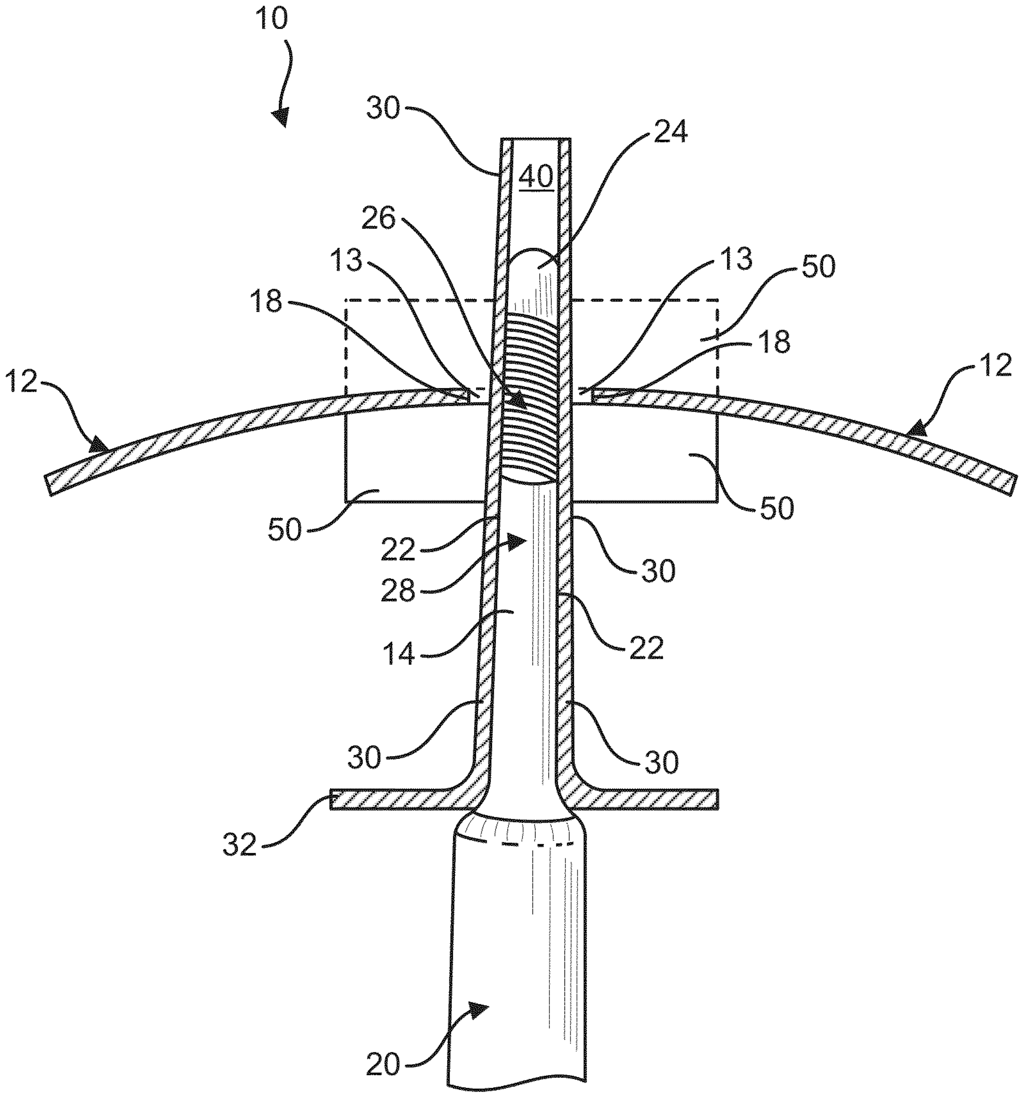
FIG. 11 is a side cross-sectional view of the cymbal mounting apparatus and the mounting post of FIG. 8 mounting an exemplary cymbal at a second position/height along the sleeve portion of the cymbal mounting apparatus.
Figure 12:
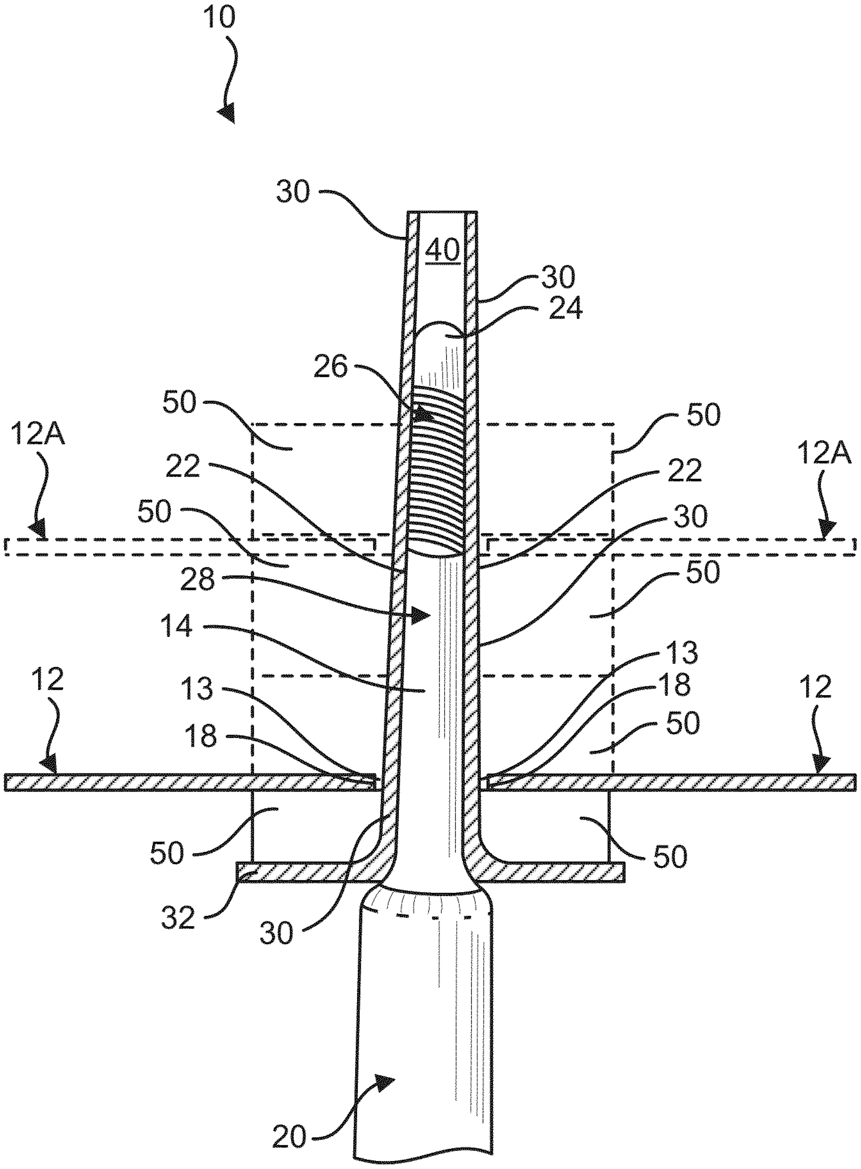
FIG. 12 is a side cross-sectional view of the cymbal mounting apparatus and the mounting post of FIG. 8 mounting an exemplary cymbal at a third position/height along the sleeve portion of the cymbal mounting apparatus.

As shown in FIGS. 1, 2 and 8-13, the cymbal mount 10 may thereby be configured such that the cross-sectional size/dimension/diameter of the exterior surface of the sleeve portion 30 varies along its length when the cymbal mount 10 is mounted on the mounting post 14 (e.g., on at least the connecting portion 22). For example, the diameter of the exterior surface of the sleeve portion 30 may taper radially inwardly (or outwardly) as the sleeve portion 30 extends upwardly away from the bottom portion thereof (e.g., from a bottom rim portion 32) to the tip or free end thereof, or at least along a portion thereof. As explained above, the variation (e.g., taper) of the cross-sectional size/dimension/diameter of the exterior surface of the sleeve portion 30 along its length, along with the use of one or more support ring/washer 50, allows at least one cymbal 12 to be positioned along differing positions of the length of the sleeve portion 30 to vary the size of the gap/joint 13 between the inner surface of the mounting aperture 18 of the cymbal 12 and the exterior surface of the sleeve portion 30 to vary the movement and resonance of the cymbal 12 during use/play thereof, as shown in FIGS. 10-12 for example.

As shown in FIGS. 1-13, cymbal mount 10 may include a cymbal support rim portion 32 extending outwardly from a bottom end portion of the sleeve portion 30, such as from the bottom end of the sleeve portion 30. In some embodiments, the rim portion 32 may extend circumferentially about and/or radially outwardly from the bottom or lower end or portion of the sleeve portion 30. The outwardly projecting rim portion 32 may have sufficient rigidity for the cymbal 12 to be supported thereon with minimal deflection of the rim portion 32.

The rim portion 32 may define an outer maximum cross/sectional dimension or size D3, such as an outer diameter, as shown in FIG. 8. The maximum cross/sectional dimension D3 of the rim portion 32 may be any size. In some embodiments, the maximum cross/sectional dimension D3 of the rim portion 32 may be at least about ½ inch, or within the range of about ½ inch to about 3 inches. In the exemplary illustrative embodiment, the maximum cross/sectional dimension D3 of the rim portion 32 of the cymbal mount 10 is a diameter of about 1.5 inches. In some embodiments, the rim portion 32 of the cymbal mount 10 may be at least about 3 mm thick (along the length direction of the sleeve portion 30). In some embodiments, the portion 32 of the cymbal mount 10 may be within the range of about 3 mm to about 7 mm thick. In some embodiments, the portion 32 of the cymbal mount 10 may about 3 mm thick, or about 6 mm thick.

The rim portion 32 may define a top support side facing toward the tip of the sleeve portion 30 configured to physically support, directly or indirectly, at least one cymbal 12 when the at least one cymbal 12 is mounted on the sleeve portion 30, as discussed above, and positioned on/over the top support side.

Figure 13:
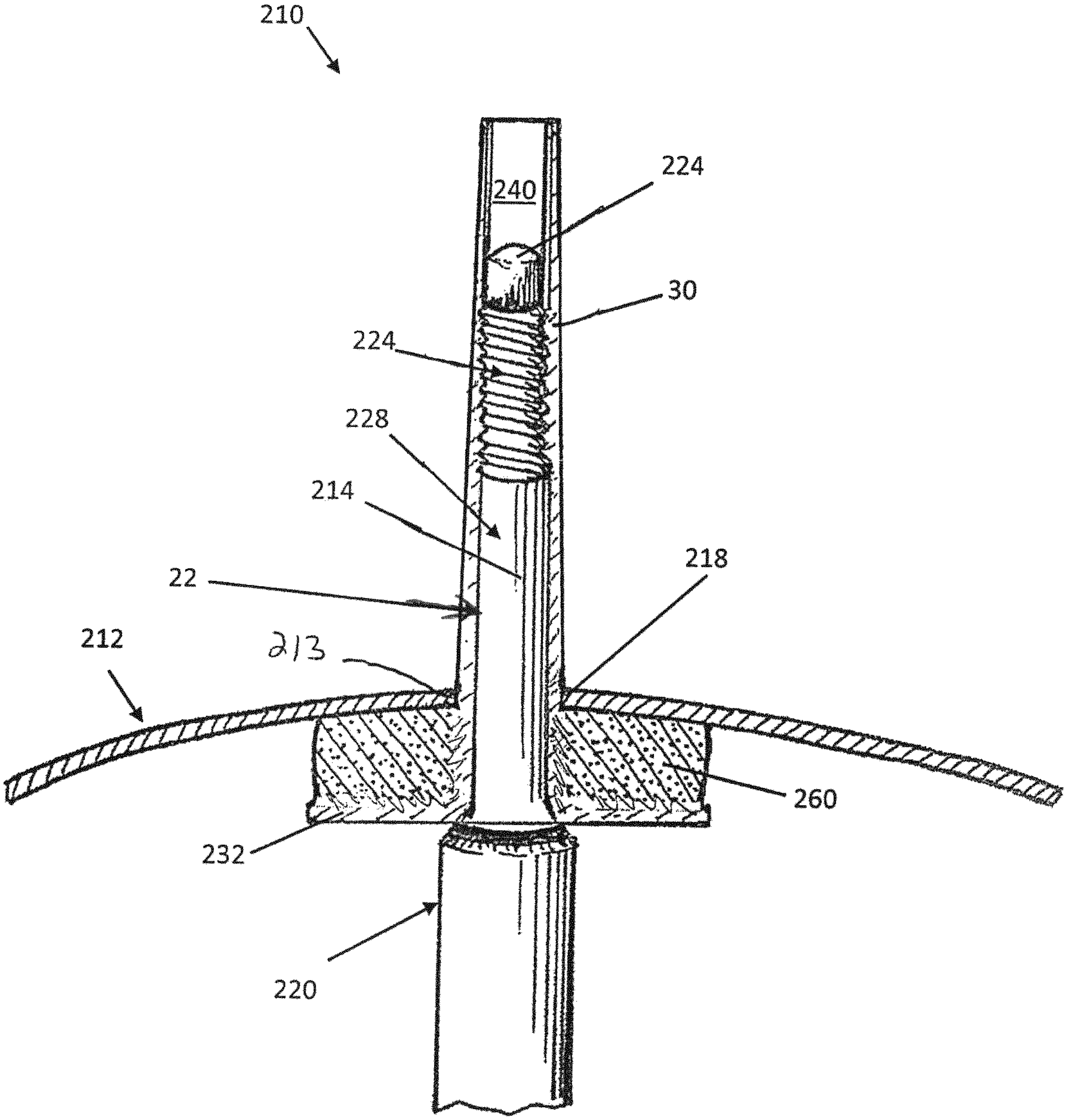
FIG. 13 is a side cross-sectional view of another exemplary cymbal mounting apparatus installed on an exemplary mounting post mounting an exemplary cymbal according to the present disclosure.

In some embodiments, as shown in FIG. 13, one exemplary cymbal mount 210 may include a liner portion 260 extending from the upper top support side of the rim portion 232 about at least a portion of the sleeve portion 230. In some embodiments, the liner portion 260 may be relatively soft and/or flexible. F or example, in some embodiments the liner portion 260 may be softer and/or more flexible than the rim portion 232 and/or the sleeve portion 230. In some embodiments, the liner portion 260 may be formed of an elastomer or be elastomeric. The liner portion 260 may be more flexible than at least the rim portion 232 of the mount 210.

As shown in FIG. 13, in one exemplary embodiment, the liner portion 260 may be over-molded onto the top support side of the rim portion 232 of the mount 210. In some embodiments, the liner portion 260 may be formed of a second softer elastomer over-molded onto a first elastomer of the rim portion 232 and/or the sleeve portion 230 of the mount 210. In this way, the mount 2210 and the liner portion 260 may be combined into a single finished molded component, as shown in FIG. 10. As also shown in FIG. 13, a cymbal 212 may be placed over the liner portion 260 and may rest upon, or be directly supported by, the liner portion 260. The relatively soft liner portion 260 may allow the cymbal 212 to rest comfortably on the rim portion 232 in the same manner as the washer 250, but be an integral part of the mount 210 and remain affixed to the mounting post 214 at all times.

As shown in FIGS. 5, 6, 8 and 10-13, the sleeve portion 30 and the rim portion 32 of the cymbal mount 10 may be integral. In some embodiments, the cymbal mount 10 may be of one-piece construction or a unitary single component. As noted above, the rim portion 32 (and/or the sleeve portion 30) may be made from an elastomer material and/or a flexible polymer material. In some embodiments, the rim portion 32 and the sleeve portion 30 are formed of the same flexible material.

As noted above, the outer surface of the sleeve portion 30 may be conical or radially tapered (e.g., the sleeve portion 30 may be of a truncated cone shape) (in use), and the rim portion 32 may be a circular disc shape. The sleeve portion 30 and the rim portion 32 may be aligned along a common axis. In this way, in some embodiments, the top or upper surface of the rim portion 32 may be oriented within about 80 to about 100 degrees to the exterior surface of the sleeve portion 30.

As shown in FIGS. 5-8 and 10-13, the sleeve portion 30 may define or include an inner cavity 40 extending from the bottom end along at least a portion of the length configured to mount on the mounting post 14. In some embodiments, the inner cavity 40 extends entirely through the sleeve portion 30 along the length direction, as shown in FIGS. 5-8 and 10-13. The inner cavity may thereby extend axially through the sleeve portion 30 and the rim portion 32. However, in alternative embodiment (not shown), inner cavity 40 may extend only partially through the sleeve portion 30 along the length direction from the bottom end thereof.

Figure 5:
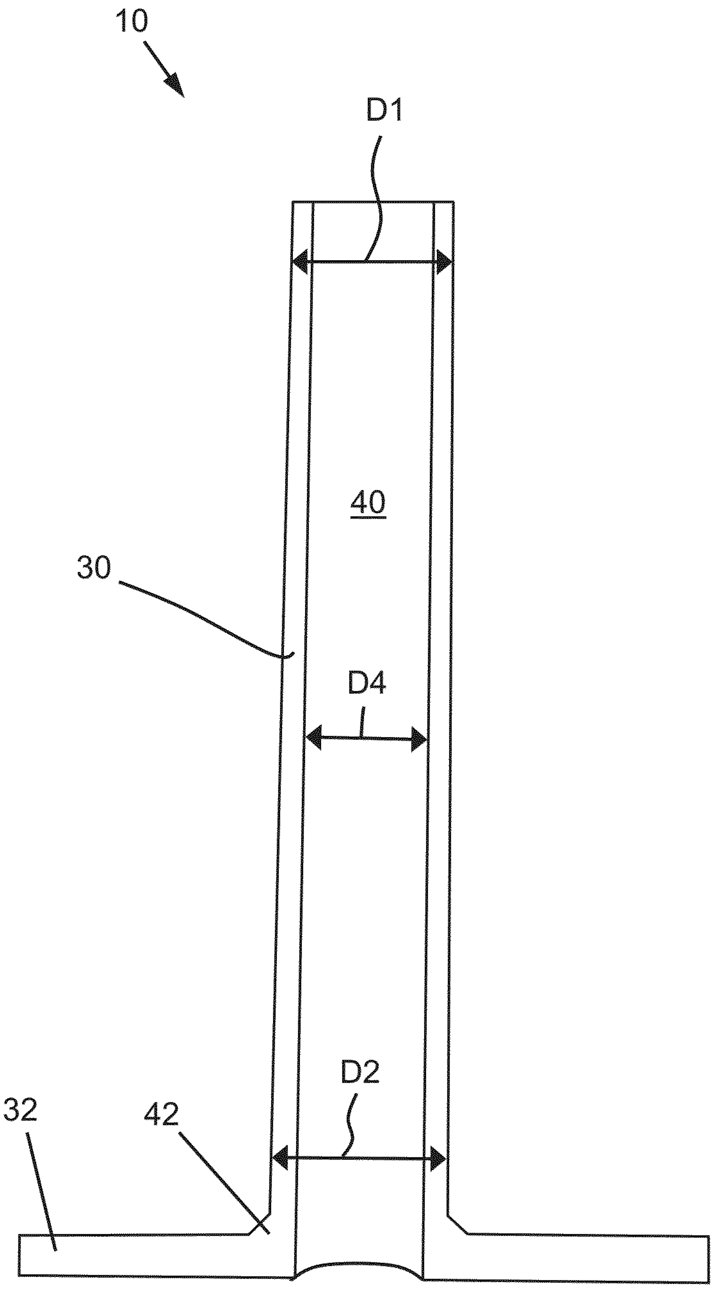
FIG. 5 is a side cross-sectional view of the cymbal mount of FIG. 3.

In some embodiments, the inner cavity 40 is substantially cylindrical such that it defines a substantially constant cross-sectional diameter along the length direction, as shown in FIGS. 5-8 and 10-13. As shown in FIGS. 5 and 8, the inner cavity 40 may define a minimum cross-sectional dimension or size D4 (e.g., diameter) along its length. In some embodiments, the minimum cross-sectional dimension D4 of the inner cavity 40 is less than a maximum cross-sectional dimension (e.g., diameter) of the mounting post 14 such that the sleeve portion 30 applies a compressive force to the mounting post 14 when installed thereon, as shown in FIGS. 8 and 10-13.

In some embodiments, the minimum cross-sectional dimension D4 (e.g., diameter) of the inner cavity 40 is at least about 5% undersized of the maximum cross-sectional dimension (e.g., diameter) of the mounting post 14. In some embodiments, the minimum cross-sectional dimension D4 (e.g., diameter) of the inner cavity 40 of the sleeve portion 30 is within the range of about 5% to about 20% undersized of the maximum cross-sectional dimension (e.g., diameter) of the mounting post 14. In some embodiments, the minimum cross-sectional dimension D4 (e.g., diameter) of the inner cavity 40 of the sleeve portion 30 is about 10% undersized of the maximum cross-sectional dimension (e.g., diameter) of the mounting post 14. For example, in embodiments wherein the maximum cross-sectional dimension (e.g., diameter) of the connecting portion 22 (e.g., cylindrical connecting portion 22) of the mounting post 14 of a mount 10 is about 8 mm, the minimum cross-sectional dimension D4 (e.g., diameter) of the inner cavity 40 of the sleeve portion 30 may be about 7.1 mm.

In some embodiments, the minimum cross-sectional dimension D4 (e.g., diameter) of the inner cavity 40 is at least about 5% less than the maximum cross-sectional dimension of the mounting post. In some embodiments, the minimum cross-sectional dimension D4 (e.g., diameter) of the inner cavity 40 is about 10% less than the maximum cross-sectional dimension of the mounting post. In some embodiments, the minimum cross-sectional dimension D4 (e.g., diameter) of the inner cavity 40 is about 7 mm. In some embodiments, the inner cavity 40 of the sleeve portion 30 and the mounting post 14 are cylindrical such that the minimum cross-sectional dimension D4 of the inner cavity 40 and the maximum cross-sectional dimension of the mounting post 14 are diameters.

As shown in FIGS. 5-8 and 10-13, the outer surface and the inner cavity 40 of the sleeve portion 30 may be formed by an annular wall of the sleeve portion. The cross-sectional thickness of the annular wall may vary along the length of the sleeve portion 30 such that the maximum cross-sectional dimension or size of the outer surface of the sleeve portion varies along the length of the sleeve portion 30, as described above. In some such embodiments, the inner surface of the annular wall of the sleeve portion 30 may be angled toward the outer surface thereof along its length, and/or the outer surface of the annular wall of the sleeve portion 30 may be angled toward the inner surface thereof along its length. In some embodiments, the inner cavity 40 may be cylindrical such that the maximum cross-sectional size/diameter D4 remains constant along the length of the sleeve portion 30, as shown in FIGS. 5-8 and 10-13. In such embodiments, the inner surface of the annular wall of the sleeve portion 30 may extend axially, and the outer surface may be angled toward the axis as it extends from the bottom portion to the top portion of the sleeve portion 30, as shown in FIGS. 5-8 and 10-13.

As shown in FIGS. 5-8 and 10-13, in some embodiments, the annular wall of the sleeve portion 30 defines a first cross-sectional thickness at the top portion of the sleeve portion 30 and a second cross-sectional thickness at the bottom portion of the sleeve portion 30 that is greater than the first cross-sectional thickness. Further, as also shown in FIGS. 5-8 and 10-13, the annular wall of the sleeve portion 30 may define a third cross-sectional thickness at a medial portion of the sleeve portion 30 between the bottom and top portions thereof along the length direction that that is greater than the first cross-sectional thickness and less than the second cross-sectional thickness.

As shown in FIGS. 8 and 10-13, the sleeve portion 30 may extend over or about the non-threaded portion 28 and/or the threaded portion 26 of the mounting post 14. For example, the mount 10 may be placed over at least a portion of the threaded portion 26 of the mounting post 14 and press fit in place. The undersize of the minimum cross-sectional dimension or size D4 (e.g., diameter) of the inner cavity 40 of the sleeve portion 30 of the mount 10 with respect to the maximum cross-sectional dimension (e.g., diameter) of the mounting post 14, and the flexible, elastic or elastomeric properties/nature of the sleeve portion 30/mount 10, causes the mount 10/sleeve portion 30 to apply a compressive force to the mounting post 14 to secure the mount 10 to the mounting post 14. For example, the resilient/elastic (elastomeric) properties of the sleeve portion 30 may be configured to allow the sleeve potion 32 to stretch over the mounting post 14 providing a tight squeeze fit of at least the sleeve potion 30 onto mounting post 14 to lock or fix the mount 10 to the mounting post 14, as shown in FIGS. 8 and 10-13.

Figure 6:
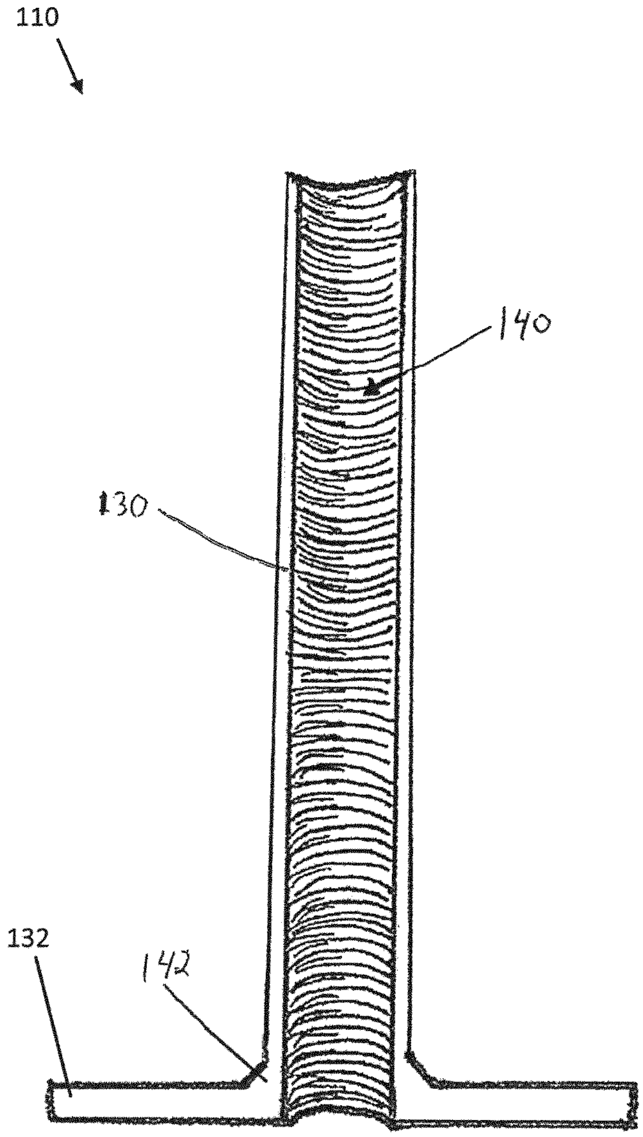
FIG. 6 is a side cross-sectional view of another exemplary cymbal mount of an exemplary mount cymbal mounting apparatus according to the present disclosure.
Figure 7:
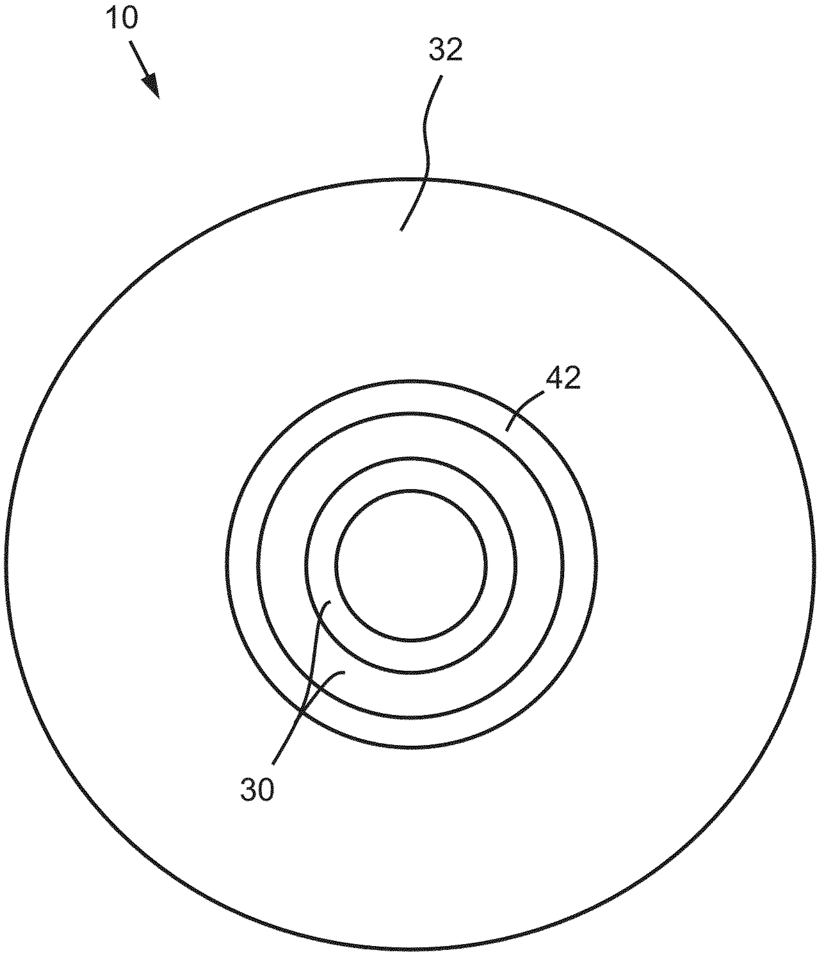
FIG. 7 is a top view of the cymbal mount of FIG. 3.

As shown in FIG. 5, in some embodiments the interior surface of the sleeve portion 30 of the mount 10 that defines the inner cavity 40 may be entirely or at least partially non-threaded such that it defines or includes a substantially smooth wall surface. However, in alternative embodiment of a cymbal mount 110, as shown in FIG. 6, a mount 110 may include a sleeve portion 130 with an interior surface portion that defines the inner cavity 140 that is entirely or at least partially internally threaded or includes slits or recesses therein. The annular wall of the sleeve portion 140 may thereby define or include an internally threaded wall surface or a slotted or recessed wall surface. In such embodiments, the internal threads/recesses may engage the threaded portion 26 of the mounting post 14 (or another portion of the mounting post 14), which may aid in securely affixing the mount 10 to the post 14.

In some embodiments, the total length of the sleeve portion 30/inner cavity 40/mount 10 may be greater than at least half the total length of the mounting post 14. For example, the mounting post 17 may defines a total length extending between shoulder portion 20 and the free end 24 thereof, and the total length of the sleeve portion 30/inner cavity 40/mount 10 is at least one half the total length of the mounting post 14. As shown in FIGS. 8 and 10-13, in some preferable embodiments, the total length of the sleeve portion 30/mount 10 is greater than the total length of the mounting post 14. In some exemplary embodiments, the sleeve portion 30/inner cavity 40/mount 10 defines a length of at least about 2 inches or about 2½ inches.

In some embodiments, the sleeve portion 30 of the mount 10 may configured such that it can be slid over the mounting post 14 until the sleeve portion 30 engages or abuts the shoulder portion 20, as shown in FIGS. 8 and 10-13. However, the sleeve portion 30 of the mount 10 may be configured to be slid over the mounting post 14 to a position where the sleeve portion 30 is spaced away from the shoulder portion 20.

As shown in FIG. 8, in some embodiments, the sleeve portion 30 may define an axial length L2 that is at least one half the axial length L1 of the mounting post 14. In some embodiments, the length L2 of the sleeve portion 30 is greater than the first length L1 of the mounting post 14, as shown in FIGS. 8 and 10-13.

In some embodiments, the length L2 of the sleeve portion 30/inner cavity 40/mount 10 may be configured such that when the mount 10 is installed on/over the mounting post 14, at least a portion of the sleeve portion 30 may extend past the free end 24 of the mounting post 14. For example, the length L2 of the sleeve portion 30/inner cavity 40/mount 10 may be configured such that when the mount 10 is installed on/over the mounting post 14 at least half way down the mounting post 14 to the shoulder portion 20 at least a portion of the sleeve portion 30 may extend past the free end 24 of the mounting post 14. However, the sleeve portion 30 may not extend past the free end 24 of the mounting post 14. For example, the sleeve portion 30 may extend to or even with the free end 24 of the mounting post 14. In other embodiments, the free end 24 of the mounting post 14 may extend past the sleeve portion 30. The length L2 of the sleeve portion 30/mount 10 may be purposefully designed to extend beyond the end of the free end 24 of the mounting post 14 to further prevent the cymbal 12 from dismounting during use and/or to protect drum sticks from striking the mounting post 14 and/or for appearance. The squeeze fit feature and the extended length feature of the sleeve portion 30/inner cavity 40/mount 10 may combine to prevent one or more cymbals 12 from dismounting from the sleeve portion 12 when the sleeve portion 30/inner cavity 40/mount 10 is mounted on the mounting post 14 and during use thereof.

As shown in FIGS. 3-8, the cymbal mount 10 may include a chamfer or radius 42 extending between the sleeve portion 30 and the rim portion 32. The chamfer or radius 42 may provide support strength to the rim portion 18 for the support of a cymbal 12 on the rim portion 32 and/or to help prevent the sleeve portion 30 and the rim portion 32 from separating from each other.

As discussed above, the cymbal mount 10 may be formed of elastomer or be elastomeric. The cymbal mount 10 may entirely be elastomer or elastomeric. In some embodiments, the sleeve portion 30 and/or the rim portion 32 may be elastomer or be elastomeric. As noted above, the compressive force or press fit nature of the sleeve portion 30 to the mounting post 14 may be provided, at least in part, by the resilient o elastic nature of the mount 10, which may be provided, at least in part, by an elastomer or elastomeric material. The cymbal mount 10 (e.g., the sleeve portion 30 and/or the rim portion 32) may be an elastomer, such as a polymer with viscoelasticity (having both viscosity and elasticity) and very weak inter-molecular forces, generally having low Young's modulus and high failure strain. The elastomer or elastomeric material may be any of various elastic substances resembling rubber, for example. The elastomer or elastomeric material may be Shore A durometer or Shore D durometer material. The elastomer or elastomeric material may include high elongation and flexibility or elasticity, and avoid breaking or cracking during use. The elastomer or elastomeric material may be able to be stretched to many times its original length, and may be capable of bouncing back into its original shape without permanent deformation. In some embodiments, the elastomer or elastomeric material may be a thermoset elastomer or a thermoplastic elastomer, or a combination thereof. In some embodiments, the elastomer or elastomeric material may not be melt-able (e.g., passed directly into a gaseous state), may swell in the presence of certain solvents, may be generally insoluble, may be flexible and elastic, and/or include relatively lower creep resistance. Examples of elastomer or elastomeric materials include, but are not limited to, natural rubber, polyurethanes, polybutadiene, neoprene, silicone rubber and silicone.

The cymbal mounting apparatuses, systems, devices, accessories and related methods may include the cymbal mount post 10 and at least one device for selectively mounting at least one cymbal on the sleeve portion along a length thereof. Further, the cymbal mounting apparatuses, systems, devices, accessories and related methods may include at least one device for selectively mounting at least one cymbal on a mounting post or sleeve along a length thereof.

Figure 14:
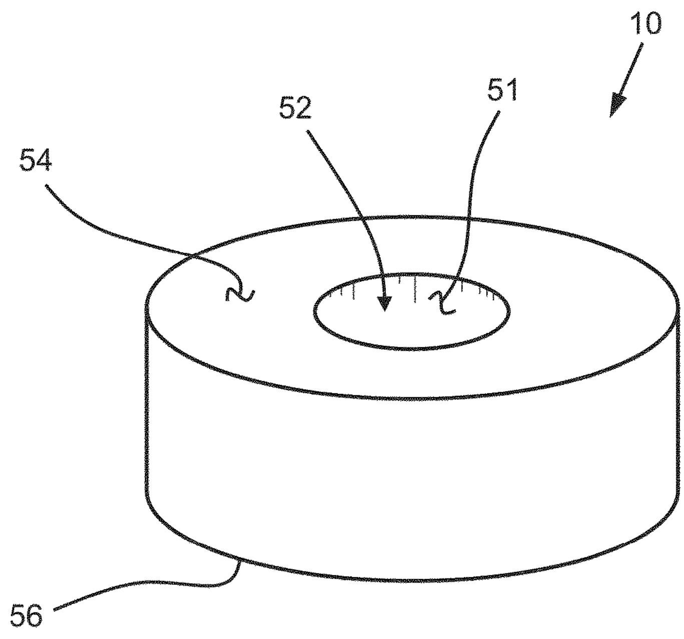
FIG. 14 is an elevational perspective view of an exemplary resilient support ring for mounting a cymbal to a mounting post or sleeve according to the present disclosure.
Figure 15:
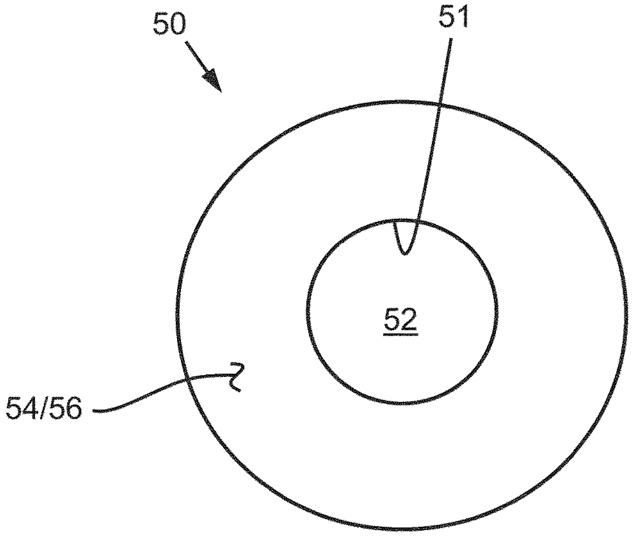
FIG. 15 is a top/bottom view of the exemplary resilient support ring of FIG. 14 according to the present disclosure.
Figure 16:
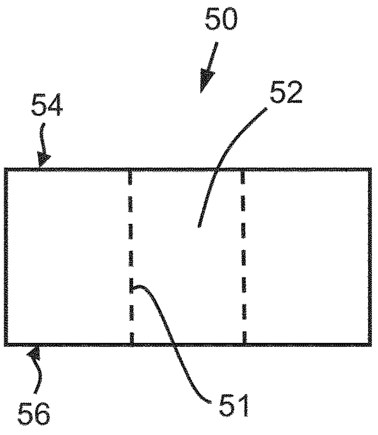
FIG. 16 is a side view of the exemplary resilient support ring of FIG. 14 according to the present disclosure.
Figure 17:
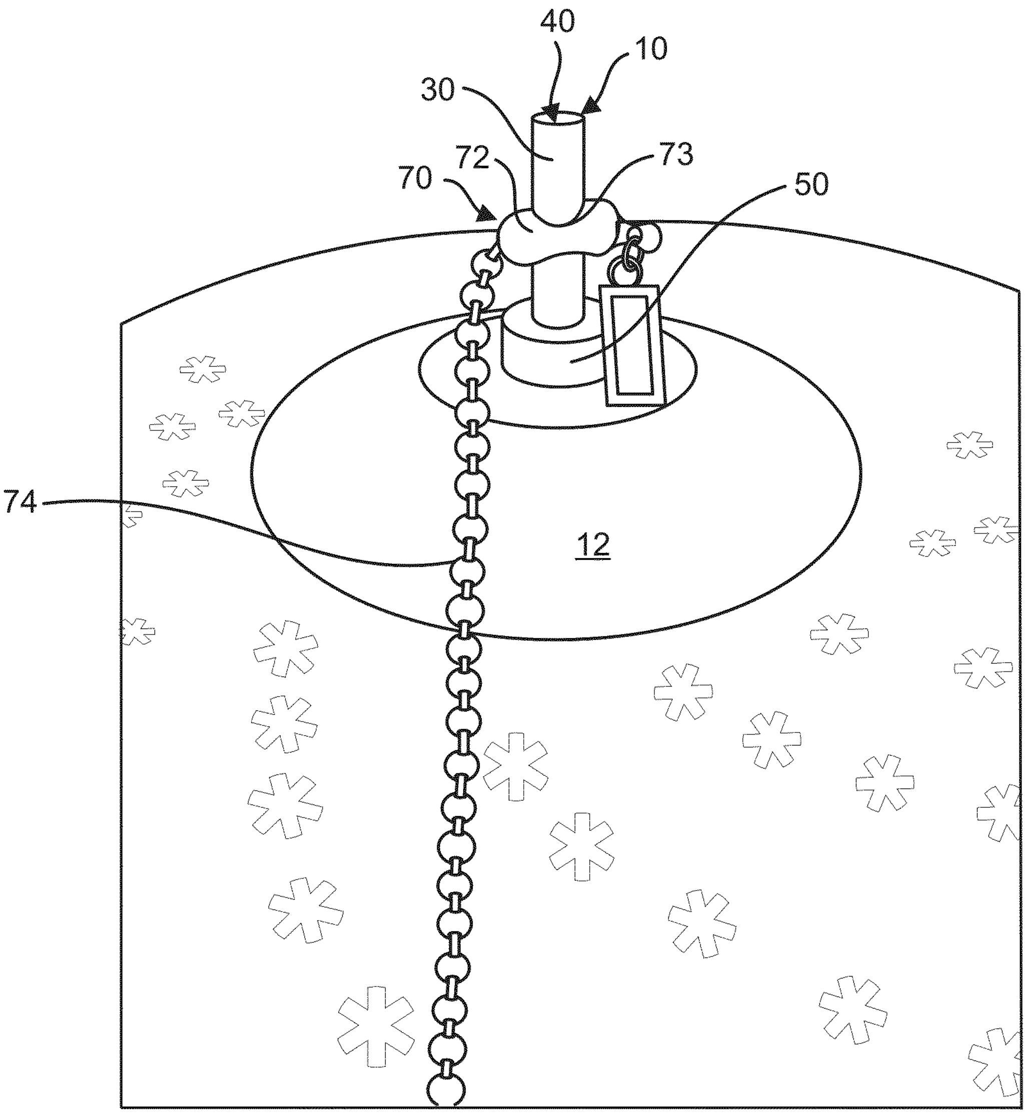
FIG. 17 is an elevational perspective view of an exemplary cymbal accessory device mounted on a mounting sleeve and engaging a cymbal also mounted thereon according to the present disclosure.

As shown in FIGS. 1, 2 and 8-17, one such device for selectively mounting at least one cymbal on a mounting post, or the sleeve portion 30, along a length thereof comprises at least one resilient support ring, washer or member 50. As shown in FIGS. 15-17, each resilient support ring 50 may include or define a top surface 54, a bottom surface 56 and an inner through hole 52 extending from the top surface 54 to the bottom surface 56. In some embodiments, the top side 54 and/or the bottom side 56 of the at least one resilient support ring 50 comprises a planar surface. The inner through hole 52 may be formed by an inner circumferential wall or surface 51, as shown in FIGS. 15-17.

In some embodiments, the at least one resilient support ring 50 is disc shaped, as shown in FIGS. 14-16. As also shown in FIGS. 14-16, in some embodiments, the at least one resilient support ring 50 defines an outer wall extending between the top 54 and bottom 56 sides thereof that defines a circular cross-sectional shape.

The inner through hole 52 may include comprises a minimum cross-sectional dimension or size (e.g., diameter) that is less than a maximum cross-sectional dimension of the outer surface of the mounting post 14, and/or the sleeve portion 30 of the mount 10, along the entirety of its length such that the at least one elastic support ring 50 applies a compressive force to the mounting post 14 and/or sleeve portion 30 when mounted thereon of a degree that is sufficient for the at least one elastic support ring 50 to physically support at least one cymbal 12 when positioned on the top surface 54 thereof. In some embodiments, the inner through hole 52 of the at least one resilient support ring 50 is circular or cylindrical such that the minimum cross-sectional dimension comprises a diameter. However, the inner through hole 52 may define any shape or size, such as any non-circular or irregular cross-sectional shape.

In some embodiments, the at least one resilient support ring 50 is of one-piece construction. In some embodiments, the at least one resilient support ring 50 is formed of a solid elastomeric material. In some embodiments, the at least one resilient support ring 50 is formed of neoprene, silicone, ethylene propylene diene monomer (EPDM) rubber, nitrile rubber, a thermoplastic elastomer or a combination thereof. In some embodiments, the cymbal mount is formed of a Shore A durometer material or a Shore D durometer material. In some embodiments, the at least one resilient support ring 50 is formed of a Shore A durometer material. In some embodiments, the at least one resilient support ring 50 is formed of a material having a Shore A hardness within the range of about 40A to about 80A, or more preferably within the range of about 50A to about 70A, or more preferably within the range of about 55A to about 65A. In one exemplary embodiments the at least one resilient support ring 50 is formed of a material having a Shore A hardness of about 60A. In some embodiments, the cymbal mount 10 is formed of a material with a first durometer, and the at least one resilient support ring 50 is formed of a material with a second durometer that is less than the first durometer.

The at least one elastic support ring 50 may be configured such that when mounted on the mounting post 14 and/or sleeve portion 30, the inner wall portion 51 directly engages the outer surface of mounting post 14 or sleeve portion 30. In some embodiments, the inner through hole 52 comprises a minimum cross-sectional dimension that is less than at least the second maximum cross-sectional dimension of the bottom portion of the outer surface of the sleeve portion 30 (as describe above) such that the elastic support ring 50 applies a compressive force to the outer surface of at least the bottom portion of the sleeve portion 30 when mounted thereon of a degree that is sufficient for the at least one elastic support ring 50 to physically support at least one cymbal 12 when positioned on the top surface 54 thereof. Further, in some embodiments, the minimum cross-sectional dimension of the inner through hole 52 is less than at least the third maximum cross-sectional dimension of the medial portion of the outer surface of the sleeve portion 30 (as describe above) such that the at least one elastic support ring 50 applies a compressive force to the outer surface of at least the medial and bottom portions of the sleeve portion 30 when mounted thereon of a degree that is sufficient for the at least one elastic support ring 50 to physically support at least one cymbal 14 when positioned on the top surface 54 thereof. Similarly, in some embodiments, the minimum cross-sectional dimension of the inner through hole 52 is less than the first maximum cross-sectional dimension of the top portion of the outer surface of the sleeve portion 30 (as describe above) such that the at least one elastic support ring 50 applies a compressive force to the outer surface of the top portion of the sleeve portion 30 when mounted thereon sufficient to at least retain at least one elastic support ring 50 (and potentially a cymbal 12 positioned there-below) on the sleeve portion 30.

In some embodiments, the minimum cross-sectional dimension (e.g., diameter) of the inner through hole 52 is at least about 10% less than the greatest or largest cross-sectional dimension/size of the outer surface of the mounting post 14 and/or the sleeve portion 30 (such as the second maximum cross-sectional dimension (e.g., diameter) of the sleeve portion 30, as described above). In some embodiments, the minimum cross-sectional dimension (e.g., diameter) of the inner through hole 52 is at least about 20% less than the greatest or largest cross-sectional dimension/size of the outer surface of the mounting post 14 and/or the sleeve portion 30 (such as the second maximum cross-sectional dimension (e.g., diameter) of the sleeve portion 30, as described above). In some embodiments, the minimum cross-sectional dimension (e.g., diameter) of the inner through hole 52 is at least about 25% less than the greatest or largest cross-sectional dimension/size of the outer surface of the mounting post 14 and/or the sleeve portion 30 (such as the second maximum cross-sectional dimension (e.g., diameter) of the sleeve portion 30, as described above). In some embodiments, the minimum cross-sectional dimension (e.g., diameter) of the inner through hole 52 is at least about 10% less than the smallest or least cross-sectional dimension/size of the outer surface of the mounting post 14 and/or the sleeve portion 30 (such as the first maximum cross-sectional dimension (e.g., diameter) of the sleeve portion 30, as described above). In some exemplary embodiments, the minimum cross-sectional dimension (e.g., diameter) of the inner through hole 52 is within the range of about 5 mm and about 10 mm.

In some exemplary embodiments, a mounting device, system and/or method may include a plurality of the resilient support rings 50. For example, a mounting device, system and/or method may include a plurality of at resilient support rings 50 for mounting at/on/to differing portions of the outer surface of the sleeve portion 30 or mounting post 14 along the length direction thereof. Each resilient support ring 10 may thereby comprises a thickness between the top 54 and bottom 56 surfaces that extends along the length of the sleeve portion 30 and/or mounting post 14 when mounted thereon that is less than or equal to ⅓ the total length of the sleeve portion 30 or mounting post 14 such that at least three support rings 50 can be fully mounted thereon at the same time.

As shown in FIGS. 10-12, at least one first support ring 50 may be positioned/mounted below a cymbal 12 along the length direction such that the at least one first support ring 50 physically supports the cymbal 12 on the top surface 54 thereof. In some embodiments, the bottom side 56 of the at least one first support ring 50 may be positioned on (in abutment with) the top support side of the rim portion 32 of the mount 12, as shown in FIGS. 10 and 12. In some other embodiments, the bottom side 56 of the at least one first support ring 50 may be spaced from the rim portion 32 of the mount 12, as shown in FIGS. 10 and 11. As also shown in FIGS. 10-12, at least one second support ring may be positioned/mounted above the cymbal 12 along the length direction such that the at least one second support ring physically prevents the cymbal 12 from dismounting from the sleeve portion 30 and/or mounting post 14.

As shown in FIG. 12, in some embodiments, at least one first support ring 50 may be mounted on the sleeve portion 14 (or mounting post 14) and positioned between the rim portion 32, and a first cymbal 12 mounted on the sleeve portion 30 of the cymbal mount 10 (or mounting post 14) above the at least one first support ring 50 such that the top surface 54 of the at least one first support ring 50 contacts/abuts/physically supports the bottom side of the first cymbal 12. As also shown in FIG. 12, at least one second support ring 50 may be mounted on the sleeve portion 30 (or mounting post 14) and positioned above the first cymbal 12 along the length direction, which may retain the first cymbal 12 on the mount 10 (or mounting post 14). The bottom side 56 of the at least one second support ring 50 may or may not contact/abut/engage the top side of the first cymbal 12. In such an embodiment, as shown in FIG. 12, second cymbal 12A may be mounted on the sleeve portion 30 of the cymbal mount 10 (or mounting post 14) above the at least one first support ring 50 such that the top surface 54 of the at least one second support ring 50 contacts/abuts/physically supports the bottom side of the second cymbal 12A. As also shown in FIG. 12, at least one third support ring 50 may be mounted on the sleeve portion 30 (or mounting post 14) and positioned above the second cymbal 12A along the length direction, which may retain the second cymbal 12A on the mount 10 (or mounting post 14).

In some embodiments, at least one elastic/resilient support ring 50 may be utilized with the cymbal mount 10 described above with the tapered sleeve portion 30 to configure, select or vary the size of the gap/joint 13 between the inner surface of the mounting aperture 18 of the cymbal 12 and the outer surface of the sleeve portion 30 (which varies in diameter/size along at least a portion of the length thereof, as described above) to vary the movement and/or resonance of the cymbal 12 when struck, as shown in FIGS. 10-12. Further, in some embodiments, differing pluralities of the resilient/elastic support rings 50, and/or support rings 50 of differing thicknesses, may be utilized position a cymbal 12 along the length of the sleeve portion 12 to configure, select or vary the size of the gap/joint 13 between the inner surface of the mounting aperture 18 of the cymbal 12 and the outer surface of the sleeve portion 30 (which varies in diameter/size along at least a portion of the length thereof, as described above) to vary the movement and/or resonance of the cymbal 12 when struck, as shown in FIGS. 10-12.

At least one elastic/resilient support ring 50 may exert a compressive force to the sleeve portion 30 (and thereby potentially to the mounting post 14) sufficient to maintain the position of the ring 50 and one or more cymbals 12 resting thereon along the length of the sleeve portion 30. Alternatively, a plurality of support ring 50 stacked on the rim portion 32 may be utilized to maintain the position of one or more cymbals 12 along the length of the sleeve portion 30. In this way, as shown in FIGS. 10-12, the position of the at least one elastic/resilient support ring 50 along the length of the of the sleeve portion 30 can be varied to vary the size of the gap/joint 13 between the inner surface of the mounting aperture 18 of the cymbal 12 and the outer surface of the sleeve portion 30 (which varies in diameter/size along at least a portion of the length thereof, as described above) to vary the movement and/or resonance of the cymbal 12 when struck/played. In some embodiments, at least one additional or supplemental elastic/resilient support ring 50 may be positioned above a cymbal 12 (and may engage a top side of the cymbal 12) to further control/vary the movement and/or resonance of the cymbal 12 and/or prevent the cymbal 12 from traveling up the sleeve portion 14 and dismounting from the sleeve portion 14, as shown in FIGS. 10-12. Positional stacking of a plurality of cymbals 12 is also possible via at least one support ring 50 positioned above a lower cymbal 12, such as in the case of an upper cymbal (e.g., a splash or china cymbal) for example, as shown in FIG. 12.

Pinching or sandwiching a cymbal 12 between two elastic/resilient support rings 50 also allows for a drummer to control cymbal swing and motion. When stacking multiple cymbals, the elastic/resilient support rings 50 can prevents the two cymbals 12 from touching one another.

In some embodiments, the elastic/resilient support rings 50 may be relatively soft and/or flexible. For example, in some embodiments elastic/resilient support rings 50 may be softer and/or more flexible than the rim portion 32 and/or the sleeve portion 30 of the mount 10. In some embodiments, the support ring 50 may be formed of an elastomer material or another similar material. In some embodiments, the support ring 50 may be formed of a material that does not mute a cymbal 12, which can occur with soft foam, felt and other like materials. In some embodiments, the support rings 50 may be formed of a solid material, such as a solid elastomer, that does not mute or dampen a cymbal 12, and also allows for support of the cymbal 12 without deformation, sagging or slumping which can lead to mispositioning of the cymbal 12 due to material fatigue, for example. In some embodiments, elastic/resilient support rings 50 of differing thicknesses, widths and/or stiffnesses may be provided as part of a kit or system to provide a plurality of varied cymbal 12 configurations on the sleeve portion 30. However, as discussed above, an elastic/resilient support ring 50 may not be utilized with the mount 10, and a cymbal 12 may be positioned directly on the support rim portion 32. In some such embodiments, the support rim portion 32 may be at least about 3 mm thick, such as about 6 mm thick.

The cymbal mounting apparatuses, systems, devices, accessories and related methods may include the cymbal mount post 10, at least one of the resilient support rings 50, a device for altering the sound emitted by a cymbal, or a combination thereof. Further, the cymbal mounting apparatuses, systems, devices, accessories and related methods may include a device for altering the sound emitted by a cymbal that is mounted on a mounting post or sleeve defining a maximum cross-sectional dimension (as described above).

FIGS. 17-20 illustrate an exemplary accessory device 70 for altering the sound emitted by a cymbal that is mounted on a mounting post or sleeve portion, such as but not limited the sleeve portion 30 of the cymbal mount 10 described above, defining a maximum cross-sectional dimension. As shown in FIGS. 17-20, the device 70 includes a connector member or grommet 72 and an elongate flexible member or chain 74 removably coupled to and extended from the connector member 72 to/onto a cymbal 12 when the cymbal 12 and the connector member 72 are mounted on the mounting post 14 or sleeve portion 30, as shown in FIG. 17.

Figure 18:
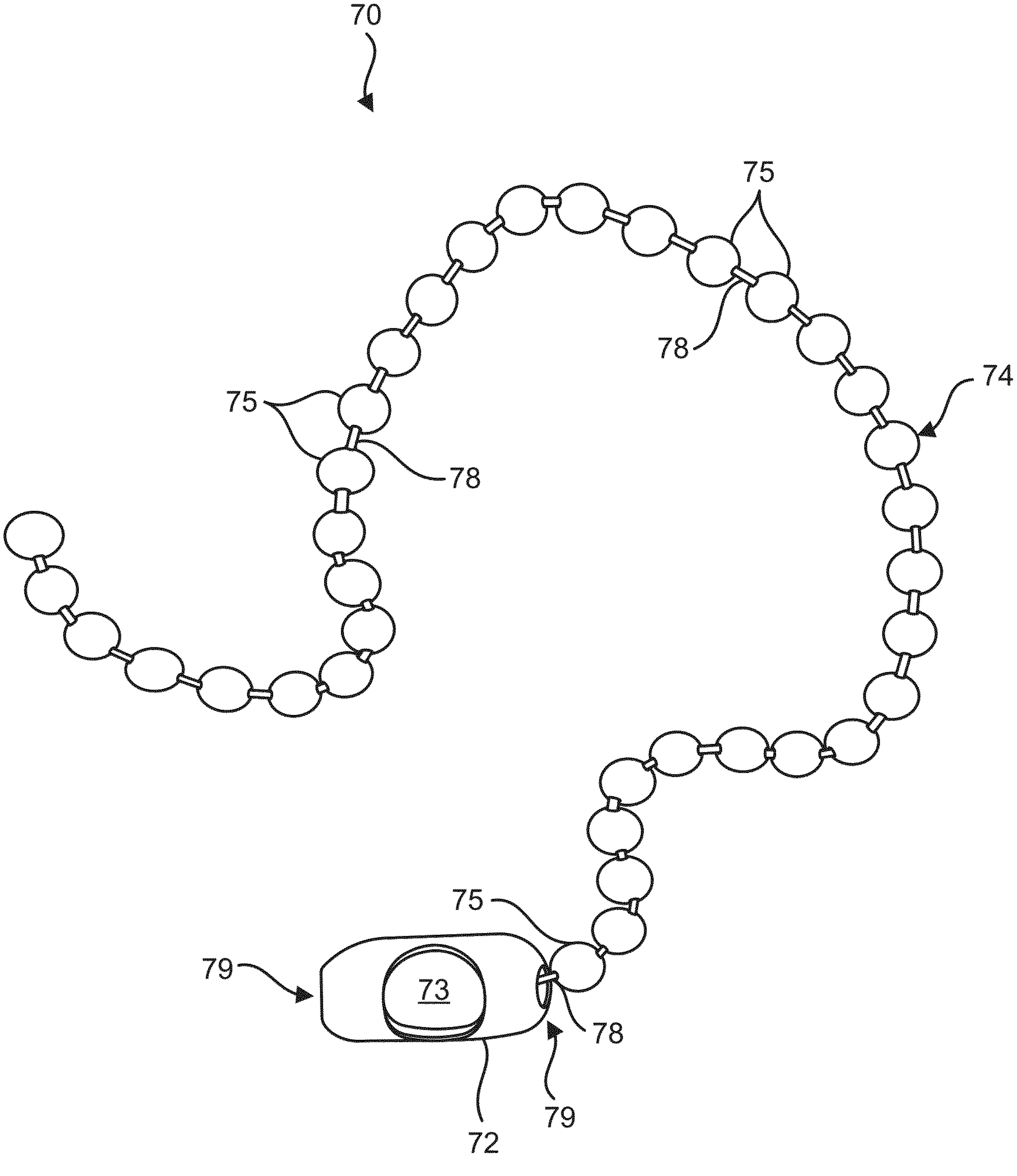
FIG. 18 is a top view of the exemplary cymbal accessory device of FIG. 17 according to the present disclosure.
Figure 19:
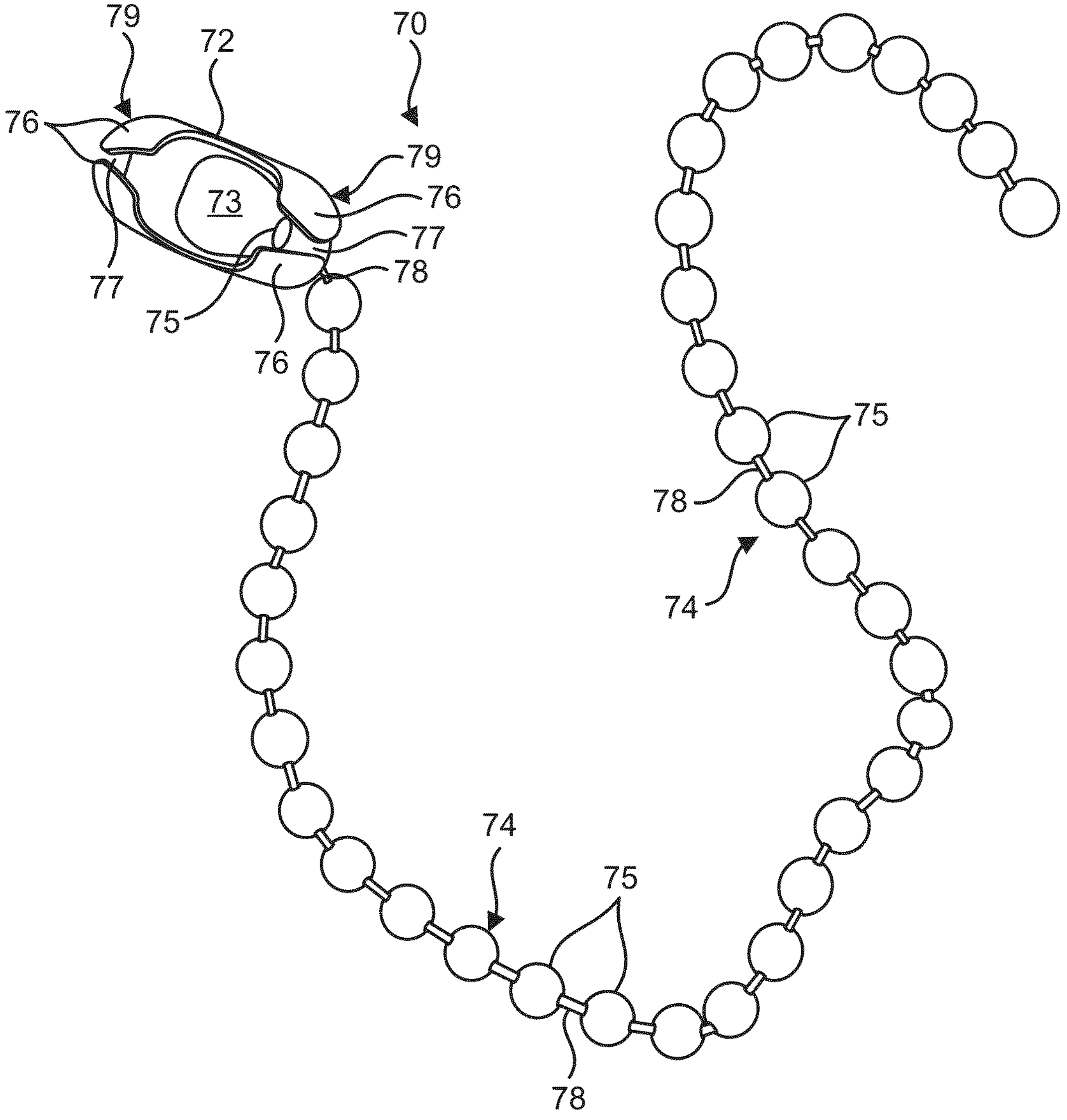
FIG. 19 is a bottom view of the exemplary cymbal accessory device of FIG. 17 according to the present disclosure.
Figure 20:
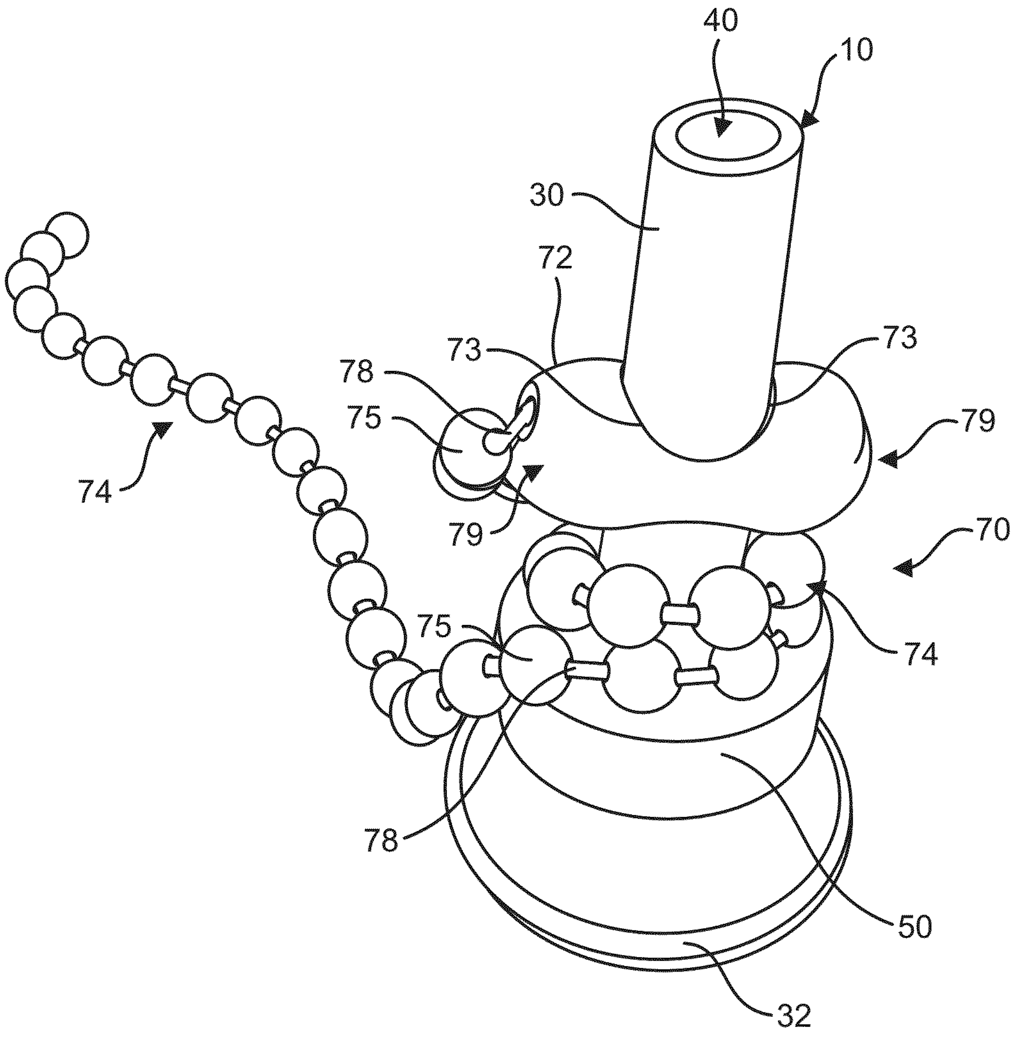
FIG. 20 is an elevational perspective view of the exemplary cymbal accessory device of FIG. 17 after rotation thereof with a portion of the flexible chain thereof wrapped around the mounting sleeve according to the present disclosure.

The connector member 72 comprises a mounting through hole 73 configured to accept the mounting post 14 or sleeve portion 30 of a mount 10 therethrough to mount the device 70 on the mounting post 14 or sleeve portion 30, as shown in FIGS. 17 and 20. The connector member 72 also comprises at least one coupling portion 79 for coupling (e.g., removably coupling) the connector member 72 and the flexible chain 74 together, as shown in FIGS. 18-20. In some embodiments, the connector member 72 is of one-piece construction.

In some embodiments, the mounting through hole 73 defines a minimum cross-sectional dimension or size (e.g., diameter) that is greater than a greatest or largest cross-sectional dimension of the mounting post 14 or sleeve portion 30. In some embodiments, as shown in FIGS. 17 and 20, the mounting through hole 73 defines a minimum cross-sectional dimension that (e.g., diameter) is less than the greatest or largest cross-sectional dimension of the mounting post 14 or sleeve portion 14 such that the connector member 72 fits snugly on, and potentially applies a compressive force to, the outer surface of the mounting post 14 or sleeve portion 14 when mounted thereon.

As shown in FIG. 20, mounting through hole 73 of the connector member 72 may be configured to rotatably mount the connector member 72 to the mounting post 14 or sleeve portion 14 when the mounting post 14 or sleeve portion 14 extends therethrough. In this way, as shown in FIG. 20, rotation of the connector member 72 about the mounting post 14 or sleeve portion 14 will tend to causes the flexible chain 74 to wrap about the mounting post 14 and/or sleeve portion 14. Such wrapping of the flexible chain 74 about the post 14 and/or sleeve portion 14 causes the total free length of the flexible chain 74 (extending from the mounting post 14 and/or sleeve portion 14) to become shorter, and thereby varying or controlling the amount of the free length of the flexible chain 74 that contacts or rests on a cymbal 12, as shown in FIG. 20. In this way, simple rotation of the connector member 72 about the mounting post 14 or sleeve portion 14, when mounted thereon, can control or dictate the amount of the free length of the flexible chain 74 that contacts or rests on a cymbal 12 and the noise created thereby when the cymbal is played (i.e., caused to vibrate/resonate), as shown in FIG. 20.

The elongate flexible member or chain 74 may comprise any flexible member or chain configuration or design. In one exemplary embodiment, as shown in FIGS. 17-20, the elongate flexible member or chain 74 comprises a plurality of link members 75 and a plurality of connecting members 78 that interconnect the link members 75 to form the flexible chain. In some such embodiments, the elongate flexible member or chain 74 comprises a ball chain. However, other elongate flexible member or chain styles or configurations may equally be employed. For example, the connector member 72 may allow for differing flexible elongate flexible members or chains 74 (e.g., differing configurations, weights, sizes, lengths, etc.) to be interchangeably coupled thereto/therewith (e.g., removably coupled) to change the sound that the elongate flexible member or chain 74 causes on the cymbal 12.

As shown in FIGS. 17-20, the flexible chain 74 may be removably coupled to and extending from a coupling portion 79 of the connector member 72 and onto the cymbal 12 when the cymbal 12 and the connector member 72 are mounted on the mounting post 14 or sleeve portion 30. In some embodiments, the connector member 72 may comprise one coupling portion 79. In some other embodiments, the connector member 72 may comprise a plurality of coupling portions 79, such as a plurality of coupling portions 79 arranged around or about the mounting through hole 73 for example, as shown in FIGS. 18-20. A plurality of coupling portions 79 allows for a plurality of flexible chains 74 to be coupled to the connector member 72 and utilized on one or more cymbals 12.

In some embodiments, the at least one coupling portion 79 of the connector member 72 comprises a pair of engaging portions 76 that form an opening that is configured to allow certain smaller portions 78 of the flexible chain 74 from passing therethrough but prevent certain larger portions 754 of the flexible chain 74 from passing therethrough. For example, as shown in FIGS. 18-20, the pair of engaging portions 76 of the at least one coupling portion 79 of the connector member 72 are configured such that the opening formed therebetween/thereby allows the smaller connecting members 78 of the flexible chain 74 from passing therethrough but prevents the larger link members 75 of the flexible chain 74 from passing therethrough.

As also shown in FIGS. 18-20, the at least one coupling portion 79 of the connector member 72 may include a slot 77 formed between ends of the pair of engaging portions 76 that is configured to prevent the flexible chain 74 from passing therethrough in a natural/neutral/non-deformed position of the pair of engaging portions 76. For example, the slot 77 formed between ends of the pair of engaging portions 76 of the at least one coupling portion 79 of the connector member 72 is configured to prevent the connecting members 78 and the link members 75 of the flexible chain 74 from passing through the slot 77 in a natural position of the pair of engaging portions 76. In some such embodiments, the pair of engaging portions 76 may be elastically deformable such that in a deformed state, the slot 77 is widened or enlarged to allow a portion of the flexible chain 74 to pass therethrough, such as to allow a connecting member 78 to pass through the slot 77.

As shown in FIG. 19, the pair of engaging portions 76 of the at least one coupling portion 79 may form an inner cavity that is communication with the mounting through hole 73 of the connector member 72. The inner cavity may provide a space for the flexible chain 74 to reside, and potentially pass through the connector member 72, when the flexible chain 74 is coupled to the connector member 72 via the at least one coupling portion 79 and the connector member 72 is mounted on the mounting post 14 or sleeve portion 30, as shown in FIGS. 19 and 20.

In some embodiments, a first portion of the flexible chain 74 may be removably coupled to the connector member 72 via a coupling portion 79 thereof. To adjust the total length of the flexible chain 74 extending from the connector member 72, first portion of the flexible chain 74 may be manually decoupled from the coupling portion 79 of the connector member 74, and a second part of the of the flexible chain 74 can be manually coupled to the connector member 72 via the coupling portion 79.

The adjustable nature of the length of the flexible chain 74 via the at least one coupling portion 79 and/or the rotation of the coupling portion 79, as described above, provides customization and adjustability to a user. The accessory device 10 thereby allows a user to select or optimize the flexible chain 74 contact with a cymbal 12. For example, the flexible chain 74 may be adjusted such that it contacts a cymbal 12 as close to the mounting hole 18 thereof as possible, or such that it extends radially to the edge of a cymbal 12 with very little overhang, for example.

In some other embodiments (not shown), the elongate flexible member or chain 74 may extend into the cavity 40 of the sleeve portion 30, such as relatively tightly therein such that the elongate flexible member or chain 74 is retained therein during use. The elongate flexible member or chain 74 may extend into the hole of the cavity 40 at the free end or tip of the sleeve portion 30. In such a configuration, the elongate flexible member or chain 74 may not make contact with a cymbal 12 as close to the cymbal mounting hole 18 as desired. In such a configuration, the elongate flexible member or chain 74 may be affixed to the sleeve portion 30 of the mounting device 10, such as via a support ring 50, grommet, rubber band or the like, for example.

It is to be understood that the above description is intended to be illustrative, and not restrictive. For example, the above-described examples (and/or aspects thereof) may be used in combination with each other. In addition, many modifications may be made to adapt a particular situation or material to the teachings of the various examples without departing from their scope. While dimensions and types of materials may be described herein, they are intended to define parameters of some of the various examples, and they are by no means limiting to all examples and are merely exemplary. Many other examples will be apparent to those of skill in the art upon reviewing the above description. The scope of the various examples should, therefore, be determined with reference to the claims included herein, along with the full scope of equivalents to which such claims are entitled.

As used herein, the terms "including" and "in which" are used as the plain-English equivalents of the respective terms "comprising" and "wherein." Moreover, as used herein, the terms "first," "second," and "third," etc. are used merely as reference labels, and are not intended to impose numerical, structural or other requirements. Forms of term "based on" herein encompass relationships where an element is partially based on as well as relationships where an element is entirely based on. Forms of the term "defined" encompass relationships where an element is partially defined as well as relationships where an element is entirely defined. Further, the limitations of the claims included herein are not written in means-plus-function format and are not intended to be interpreted based on 35 U.S.C. § 112, sixth paragraph, unless and until such claim limitations expressly use the phrase "means for" followed by a statement of function cavity of further structure. It is to be understood that not necessarily all such objects or advantages described above may be achieved in accordance with any particular example. Thus, for example, those skilled in the art will recognize that the systems and methods described herein may be embodied or carried out in a manner that achieves or optimizes one advantage or group of advantages as taught herein without necessarily achieving other objects or advantages as may be taught or suggested herein.

Any and all publications cited in this specification are herein incorporated by reference as if each individual publication were specifically and individually indicated to be incorporated by reference herein as though fully set forth.

Subject matter incorporated by reference is not considered to be an alternative to any claim limitations, unless otherwise explicitly indicated.

Where one or more ranges are referred to throughout this specification, each range is intended to be a shorthand format for presenting information, where the range is understood to encompass each discrete point within the range as if the same were fully set forth herein.

While the disclosure has been described in detail in connection with only a limited number of examples, it should be readily understood that the disclosure is not limited to such disclosed examples. Rather, this disclosure can be modified to incorporate any number of variations, alterations, substitutions or equivalent arrangements not heretofore described, but which are commensurate with the spirit and scope of the disclosure. Additionally, while various examples have been described, it is to be understood that aspects of the disclosure may include only one example or some of the described examples. Also, while some disclosure are described as having a certain number of elements, it will be understood that the examples can be practiced with less than or greater than the certain number of elements.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

I claim:

1. A cymbal mounting system for mounting at least one cymbal on a mounting post, comprising:

- a cymbal mount comprising a sleeve portion elongated along a length direction and comprising a tip at a top portion, a bottom end at a bottom portion, and an inner cavity extending from the bottom end along at least a portion of the length configured to mount on the mounting post of the cymbal stand; and
- at least one resilient support ring comprising atop surface, a bottom surface and an inner through hole extending from the top surface to the bottom surface,
- wherein the sleeve portion is configured to extend through a mounting aperture of the at least one cymbal when mounted on the mounting post,
- wherein an outer surface of the sleeve portion varies in maximum cross-sectional size thereof along the length direction such that the top portion defines a first maximum cross-sectional dimension and the bottom portion defines a second maximum cross-sectional dimension that is greater than the first maximum cross-sectional dimension, and
- wherein the inner through hole of the at least one resilient support ring comprises a minimum cross-sectional dimension that is less than at least the second maximum cross-sectional dimension such that the at least one elastic support ring applies a compressive force to the outer surface of at least the bottom portion of the sleeve portion when mounted thereon to physically support the at least one cymbal when positioned on the top surface thereof.

2. The system according to claim 1, wherein the cymbal mount further comprises a rim portion extending radially outwardly from the bottom portion of the sleeve portion configured to physically support the at least one cymbal when positioned thereon.

3. The system according to claim 2, wherein the at least one resilient support ring comprises at least one first support ring mounted on the sleeve portion positioned between the rim portion and a first cymbal of the at least one cymbal.

4. The system according to claim 3, wherein the at least one resilient support ring further comprises at least one second support ring mounted on the sleeve portion positioned above the first cymbal along the length direction.

5. The system according to claim 4, wherein the at least one cymbal comprises a second cymbal mounted on the sleeve portion and supported by the top surface of the at least one second first ring, and wherein the at least one resilient support ring comprises at least one third ring mounted on the sleeve portion positioned above the second cymbal.

6. The system according to claim 1, wherein the at least one at least one resilient support ring comprises a plurality of resilient support rings configured to mount to differing portions of the outer surface of the sleeve portion along the length direction, and wherein the plurality of resilient support rings comprises at least one support ring positioned below the cymbal along the length direction such that the support ring to physically supports the cymbal on the top surface thereof.

7. The system according to claim 6, wherein the plurality of resilient support rings comprises at least one support ring positioned above the cymbal along the length direction such that the support ring physically prevents the cymbal from dismounting from the sleeve portion.

8. The system according to claim 1, wherein the cymbal mount is formed of a flexible polymer material.

9. The system according to claim 1, wherein the cymbal mount is formed of a material having a Shore A hardness within the range of about 80A to about 105A.

10. The system according to claim 1, wherein the outer surface of the sleeve further comprises a medial portion positioned between the top and bottom portions along the length direction that defines a third maximum cross-sectional dimension, the third maximum cross-sectional dimension being greater than the first maximum cross-sectional dimension and less than the second maximum cross-sectional dimension.

11. The system according to claim 1, wherein the minimum cross-sectional dimension of the inner through hole is less than the first maximum cross-sectional dimension such that the at least one elastic support ring applies a compressive force to the outer surface of the sleeve portion when mounted thereon sufficient to retain the at least one elastic support ring on the sleeve portion.

12. The system according to claim 1, wherein the maximum cross-sectional dimension of the outer surface of the sleeve portion tapers from the bottom portion to the top portion.

13. The system according to claim 12, wherein the maximum cross-sectional dimension of the outer surface of the sleeve portion substantiality smoothly tapers from the bottom portion to the top portion such that the outer surface of the sleeve portion is substantially conical.

14. The system according to claim 1, wherein the inner cavity is substantially cylindrical such that it defines a substantially constant cross-sectional diameter along the length direction.

15. The system according to claim 1, wherein the outer surface and the inner cavity of the sleeve portion are formed by an annular wall of the sleeve portion, and wherein a cross-sectional thickness of the annular wall varies along the length of the sleeve portion.

16. The system according to claim 15, wherein the annular wall defines a first cross-sectional thickness at the top portion and a second cross-sectional thickness at the bottom portion that is greater than the first cross-sectional thickness.

17. The system according to claim 1, wherein at least a portion of the inner cavity of the sleeve portion is threaded.

18. The system according to claim 1, wherein the inner cavity of the sleeve portion defines a minimum cross-sectional dimension that is less than a maximum cross-sectional dimension of the mounting post such that the sleeve portion applies a compressive force to the mounting post when installed thereon.

19. The system according to claim 1, wherein the mounting post defines a length extending between a shoulder portion and a free end thereof, and wherein the length of the sleeve portion is greater than the length of the mounting post.

20. The system according to claim 1, wherein the cymbal defines a mounting aperture of a minimum cross-sectional size, and wherein the second maximum cross-sectional dimension of the outer surface of the sleeve portion is less than minimum cross-sectional size of the mounting aperture of the cymbal.

21. The system according to claim 1, wherein the at least one resilient support ring is disc shaped.

22. The system according to claim 1, wherein the minimum cross-sectional dimension of the inner through hole is at least about 10% less than the first maximum cross-sectional dimension of the outer surface of the sleeve portion.

23. The system according to claim 1, wherein the at least one resilient support ring is of one-piece construction and formed of an elastomeric material.

24. The system according to claim 1, wherein the at least one resilient support ring is formed of a material having a Shore A hardness within the range of about 40A to about 80A.

25. The system according to claim 1, wherein the cymbal mount is formed of a material with a first durometer, and the at least one resilient support ring is formed of a material with a second durometer that is less than the first durometer.

* * * * *